(12) United States Patent
Tak et al.

(10) Patent No.: US 10,861,461 B2
(45) Date of Patent: *Dec. 8, 2020

(54) LED DESIGN LANGUAGE FOR VISUAL AFFORDANCE OF VOICE USER INTERFACES

(71) Applicant: GOOGLE LLC, Mountain View, CA (US)

(72) Inventors: Jung Geun Tak, Mountain View, CA (US); Amy Martin, Mountain View, CA (US); Willard McClellan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,143

(22) Filed: May 23, 2019

(65) Prior Publication Data

US 2019/0279634 A1    Sep. 12, 2019

Related U.S. Application Data

(63) Continuation of application No. 15/592,120, filed on May 10, 2017, now Pat. No. 10,304,450.
(Continued)

(51) Int. Cl.
*G08B 5/36* (2006.01)
*G10L 15/22* (2006.01)
(Continued)

(52) U.S. Cl.
CPC .............. *G10L 15/22* (2013.01); *G06F 3/167* (2013.01); *H04M 1/271* (2013.01); *H04M 3/493* (2013.01);
(Continued)

(58) Field of Classification Search
CPC . G08B 5/36; G10L 15/22; G06F 3/167; G06F 11/32; G06F 11/324; G06F 11/325; G09G 3/20; G09G 3/34; G09G 3/3413
See application file for complete search history.

(56) References Cited

U.S. PATENT DOCUMENTS 5,659,665 A    8/1997  Whelpley, Jr.
5,760,754 A *  6/1998  Amero, Jr. ............... G09F 9/305
                                                    345/102
(Continued)

FOREIGN PATENT DOCUMENTS

WO    WO 2012/103321 A2    8/2012
WO    WO 2014/001914 A2    1/2014
WO    WO 2014/064531 A1    5/2014

OTHER PUBLICATIONS

Google LLC, International Preliminary Report on Patentability, PCT/US2017/032002, dated Nov. 13, 2018, 7 pgs.
(Continued)

*Primary Examiner* — Andrew W Bee
(74) *Attorney, Agent, or Firm* — Morgan, Lewis & Bockius LLP

(57) ABSTRACT

A method is implemented at an electronic device for visually indicating a voice processing state. The electronic device includes an array of visual indicators and one or more microphones. The electronic device collects via the one or more microphones audio inputs from an environment in proximity to the electronic device and initializes processing of the audio inputs. A state of the processing is then determined from among a plurality of predefined voice processing states, and for each of the visual indicators, a respective predetermined illumination specification is determined in association with the determined voice processing state. In accordance with the identified illumination specifications of the visual indicators, the electronic device syn-
(Continued)

chronizes illumination of the array of visual indicators to provide a visual pattern indicating the determined voice processing state. The visual pattern is displayed on the surface of the electronic device and includes one or more discrete illumination elements.

20 Claims, 18 Drawing Sheets
(1 of 18 Drawing Sheet(s) Filed in Color)

Related U.S. Application Data

(60) Provisional application No. 62/336,551, filed on May 13, 2016, provisional application No. 62/336,566, filed on May 13, 2016, provisional application No. 62/336,565, filed on May 13, 2016, provisional application No. 62/336,569, filed on May 13, 2016, provisional application No. 62/334,434, filed on May 10, 2016.

(51) Int. Cl.
| | |
|---|---|
| H04N 21/40 | (2011.01) |
| H04N 21/20 | (2011.01) |
| H04N 21/4722 | (2011.01) |
| H04N 21/4147 | (2011.01) |
| H04N 21/47 | (2011.01) |
| H04M 3/493 | (2006.01) |
| H04N 21/422 | (2011.01) |
| G06F 3/16 | (2006.01) |
| H04N 21/239 | (2011.01) |
| H04N 21/41 | (2011.01) |
| H04M 1/27 | (2006.01) |
| H04N 21/45 | (2011.01) |
| H04N 21/475 | (2011.01) |

(52) U.S. Cl.
CPC ......... *H04N 21/20* (2013.01); *H04N 21/2393* (2013.01); *H04N 21/40* (2013.01); *H04N 21/4104* (2013.01); *H04N 21/4147* (2013.01); *H04N 21/42203* (2013.01); *H04N 21/42204* (2013.01); *H04N 21/47* (2013.01); *H04N 21/4722* (2013.01); *G10L 2015/223* (2013.01); *H04N 21/42206* (2013.01); *H04N 21/4532* (2013.01); *H04N 21/4751* (2013.01)

(56) References Cited

U.S. PATENT DOCUMENTS

| | | |
|---|---|---|
| 5,774,859 A | 6/1998 | Houser et al. |
| 6,195,641 B1 | 2/2001 | Loring et al. |
| 6,397,186 B1 | 5/2002 | Bush |
| 6,681,380 B1 | 1/2004 | Britton et al. |
| 7,260,538 B2 | 8/2007 | Calderone et al. |
| 7,660,715 B1 | 2/2010 | Thambiratnam |
| 7,698,131 B2 | 4/2010 | Bennett |
| 7,721,313 B2 | 5/2010 | Barrett |
| 8,150,699 B2 | 4/2012 | Patch |
| 8,340,975 B1 | 12/2012 | Rosenberger |
| 8,538,757 B2 | 9/2013 | Patch |
| 9,304,736 B1* | 4/2016 | Whiteley ......... G06Q 20/40145 |
| 9,338,493 B2 | 5/2016 | Van Os et al. |
| 9,424,840 B1 | 8/2016 | Hart |
| 9,443,527 B1 | 9/2016 | Watanabe et al. |
| 9,554,632 B2 | 1/2017 | Tarnow et al. |
| 9,721,570 B1 | 8/2017 | Beal |
| 9,779,757 B1* | 10/2017 | Blanksteen ............ G10L 15/22 |
| 9,786,294 B1* | 10/2017 | Bezos ..................... G06F 3/167 |
| 9,794,613 B2 | 10/2017 | Jang et al. |
| 9,967,644 B2 | 5/2018 | Chawan et al. |
| 9,990,002 B2 | 6/2018 | Kim |
| 10,026,401 B1 | 7/2018 | Mutagi et al. |
| 2003/0120744 A1 | 6/2003 | Kessler |
| 2004/0001095 A1 | 1/2004 | Marques |
| 2005/0033582 A1 | 2/2005 | Gadd |
| 2005/0144293 A1 | 6/2005 | Limont et al. |
| 2005/0212684 A1* | 9/2005 | Huang ..................... G09F 9/33 340/815.45 |
| 2006/0036642 A1 | 2/2006 | Horvitz et al. |
| 2006/0075429 A1 | 4/2006 | Istvan et al. |
| 2006/0276230 A1 | 12/2006 | McConnell |
| 2007/0192486 A1 | 8/2007 | Wilson et al. |
| 2007/0198267 A1 | 8/2007 | Jones |
| 2008/0010652 A1 | 1/2008 | Booth |
| 2008/0065388 A1 | 3/2008 | Cross |
| 2008/0167860 A1 | 7/2008 | Goller |
| 2008/0180572 A1 | 7/2008 | Pickett et al. |
| 2008/0192495 A1* | 8/2008 | Kanemaru ........... H05K 5/0017 362/375 |
| 2008/0208569 A1 | 8/2008 | Simpson |
| 2008/0228496 A1 | 9/2008 | Yu |
| 2009/0100478 A1 | 4/2009 | Craner |
| 2009/0178071 A1 | 7/2009 | Whitehead |
| 2009/0319276 A1 | 12/2009 | Chang et al. |
| 2010/0064218 A1 | 3/2010 | Bull |
| 2010/0240307 A1 | 9/2010 | Sims |
| 2010/0250239 A1 | 9/2010 | Itakura |
| 2010/0265397 A1 | 10/2010 | Dasher et al. |
| 2011/0161076 A1 | 6/2011 | Davis |
| 2011/0161085 A1 | 6/2011 | Boda |
| 2011/0283243 A1 | 11/2011 | Eckhardt et al. |
| 2011/0311206 A1 | 12/2011 | Hubner |
| 2012/0035924 A1 | 2/2012 | Jitkoff |
| 2012/0096497 A1 | 4/2012 | Xiong et al. |
| 2012/0198339 A1 | 8/2012 | Williams |
| 2012/0226981 A1 | 9/2012 | Clavin |
| 2012/0239661 A1 | 9/2012 | Giblin |
| 2012/0253822 A1 | 10/2012 | Schalk |
| 2012/0260192 A1 | 10/2012 | Detweiler |
| 2012/0265528 A1 | 10/2012 | Gruber |
| 2013/0046773 A1 | 2/2013 | Kannan |
| 2013/0132094 A1 | 5/2013 | Lim |
| 2013/0138424 A1 | 5/2013 | Koenig |
| 2013/0290110 A1 | 10/2013 | LuVogt |
| 2013/0322634 A1 | 12/2013 | Bennett |
| 2013/0332311 A1 | 12/2013 | Pu et al. |
| 2013/0339850 A1 | 12/2013 | Hardi |
| 2014/0006483 A1 | 1/2014 | Garmark et al. |
| 2014/0074483 A1 | 3/2014 | Van Os |
| 2014/0108019 A1 | 4/2014 | Ehsani |
| 2014/0125271 A1 | 5/2014 | Wang |
| 2014/0244266 A1 | 8/2014 | Brown |
| 2014/0244568 A1 | 8/2014 | Goel |
| 2014/0257788 A1 | 9/2014 | Xiong et al. |
| 2014/0278435 A1 | 9/2014 | Ganong, III |
| 2014/0297268 A1 | 10/2014 | Govrin |
| 2014/0317502 A1 | 10/2014 | Brown et al. |
| 2014/0333449 A1 | 11/2014 | Thiesfeld et al. |
| 2014/0365226 A1 | 12/2014 | Sinha |
| 2014/0365887 A1 | 12/2014 | Cameron |
| 2015/0006182 A1 | 1/2015 | Schmidt |
| 2015/0066510 A1 | 3/2015 | Bohrer et al. |
| 2015/0097666 A1 | 4/2015 | Boyd |
| 2015/0112985 A1 | 4/2015 | Roggero et al. |
| 2015/0154976 A1 | 6/2015 | Mutagi |
| 2015/0162006 A1 | 6/2015 | Kummer |
| 2015/0169284 A1 | 6/2015 | Quast et al. |
| 2015/0199566 A1 | 7/2015 | Moore et al. |
| 2015/0261496 A1 | 9/2015 | Faaborg et al. |
| 2015/0331666 A1 | 11/2015 | Bucsa et al. |
| 2015/0365787 A1 | 12/2015 | Farrell |
| 2016/0179462 A1 | 6/2016 | Bjorkengren |
| 2016/0323343 A1 | 11/2016 | Sanghavi et al. |
| 2017/0090858 A1 | 3/2017 | Paris |
| 2017/0154628 A1 | 6/2017 | Mohajer et al. |
| 2017/0180499 A1 | 6/2017 | Gelfenbeyn et al. |
| 2017/0221322 A1* | 8/2017 | Ignomirello ............ G08B 5/36 |
| 2017/0262537 A1 | 9/2017 | Harrison et al. |
| 2017/0270927 A1 | 9/2017 | Brown et al. |

(56) References Cited

U.S. PATENT DOCUMENTS

| | | |
|---|---|---|
| 2017/0300831 A1 | 10/2017 | Gelfenbeyn et al. |
| 2017/0329766 A1 | 11/2017 | Matsuyama |
| 2017/0339444 A1 | 11/2017 | Shaw et al. |
| 2017/0347477 A1 | 11/2017 | Avital |
| 2018/0004482 A1 | 1/2018 | Johnston et al. |
| 2018/0041408 A1 | 2/2018 | Dagum et al. |

OTHER PUBLICATIONS

Google, International Search Report/Written Opinion, PCT/US2017/032002, dated Aug. 25, 2017, 9 pgs.
Google LLC, International Preliminary Report on Patentability, PCT/US2017/032511, dated Nov. 13, 2018, 6 pgs.
Google Inc., International Search Report/Written Opinion, PCT/US2017/032511, dated Jul. 21, 2017, 8 pgs.
Google LLC, International Preliminary Report on Patentability, PCT/US2017/032262, dated Nov. 13, 2018, 8 pgs.
Google Inc., International Search Report/Written Opinion, PCT/US2017/032262, dated Aug. 24, 2017, 10 pgs.
Google LLC, International Preliminary Report on Patentability, PCT/US2017/032260, dated Nov. 13, 2018.
Google Inc., International Search Report/Written Opinion, PCT/US2017/032260, dated Aug. 23, 2017.
Google LLC, International Preliminary Report on Patentability, PCT/US2017/032263, dated Nov. 13, 2018.
Google Inc., International Search Report/Written Opinion, PCT/US2017/032263, dated Aug. 23, 2017, 10 pgs.

\* cited by examiner

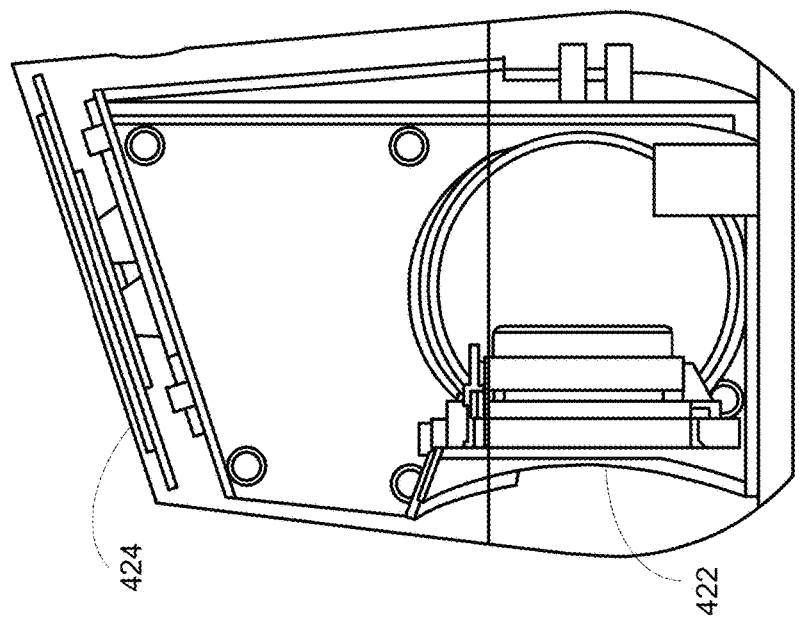
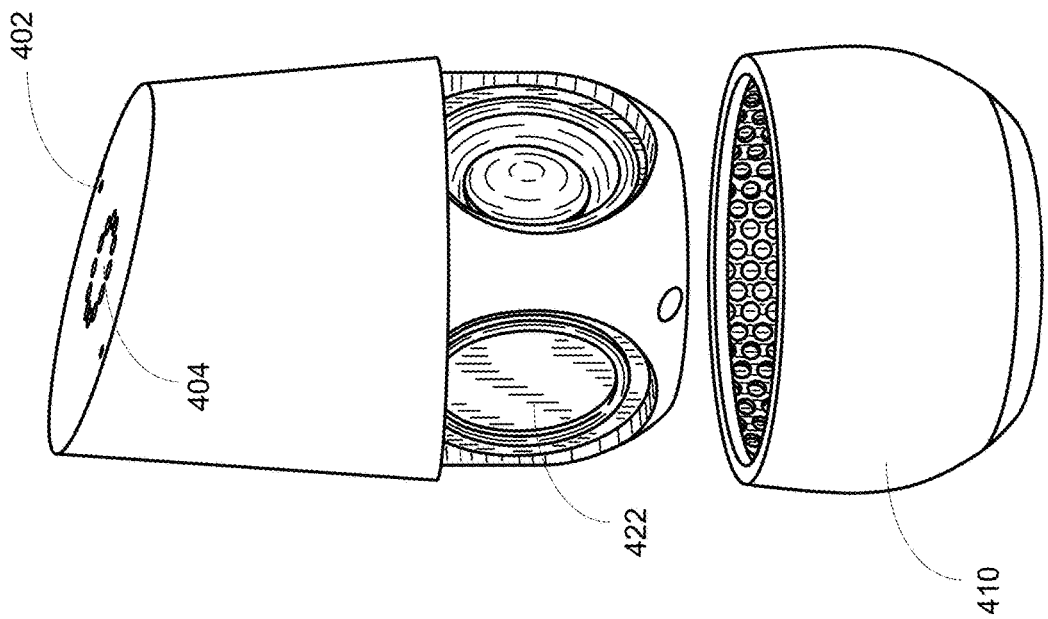

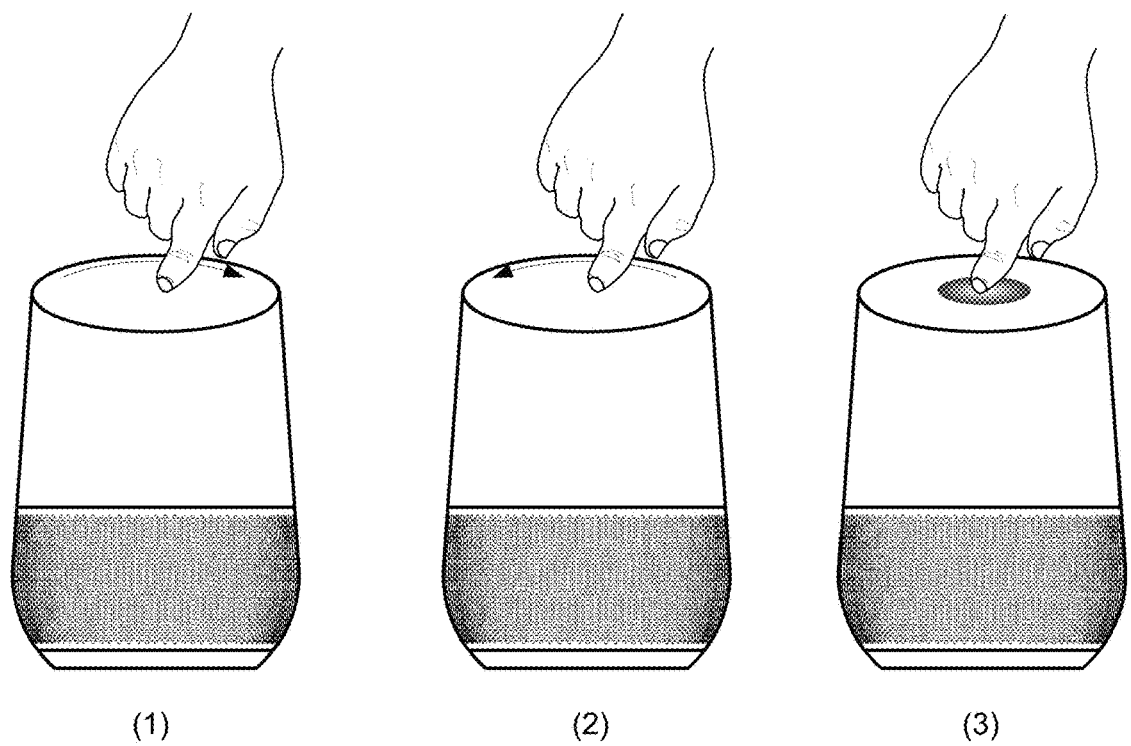
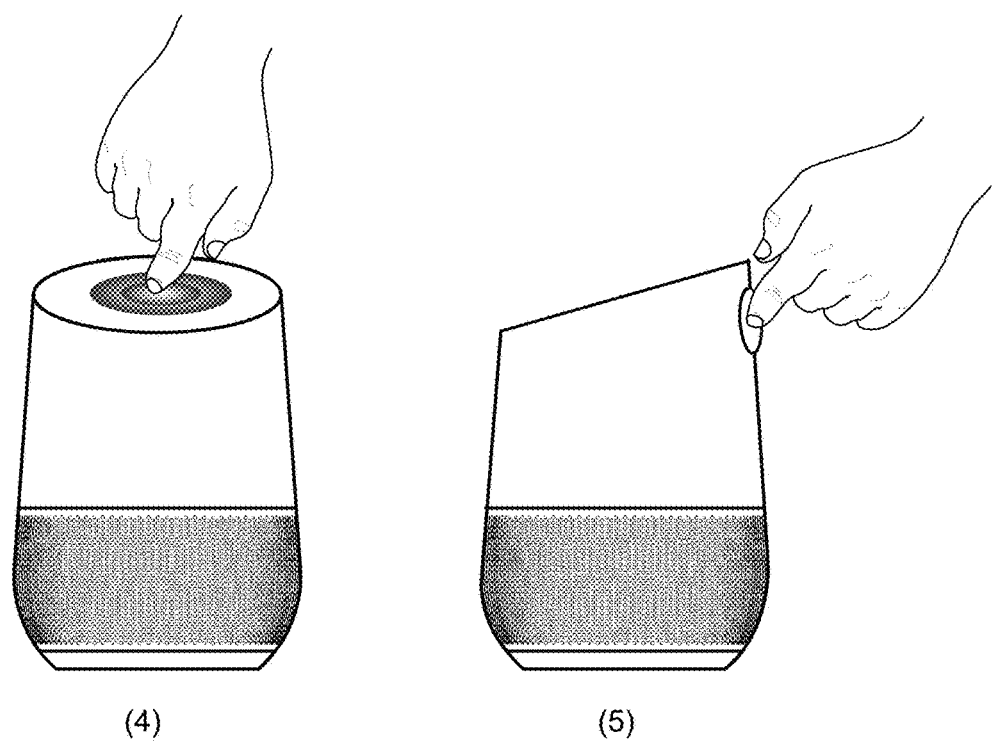
FIGURE 4F

1200 ⇘

At a server system including a processor and memory storing at least one program for execution by the processor:

Receiving a voice message recorded by an electronic device — 1202

Determining that the voice message includes a first media play request — 1204

The first media play request includes a user voice command to play media content on a media output device and a user voice designation of the media output device, the user voice command including at least information of a first media play application and the media content that needs to be played — 1206

In accordance with the voice designation of the media output device, identifying in a device registry a cast device associated in a user domain with the electronic device and coupled to the media output device — 1208

The cast device is configured to execute one or more media play applications for controlling the media output device to play media content received from one or more media content hosts — 1210

Sending to the cast device a second media play request including the information of the first media play application and the media content that needs to be played, thereby enabling the cast device to execute the first media play application that controls the media output device to play the media content — 1212

FIGURE 12

LED DESIGN LANGUAGE FOR VISUAL AFFORDANCE OF VOICE USER INTERFACES

RELATED APPLICATIONS

This application is a continuation of and claims priority to U.S. patent application Ser. No. 15/592,120, filed May 10, 2017, titled "LED Design Language for Visual Affordance of Voice User Interfaces," which claims priority to the following provisional applications, each of which is incorporated by reference in its entirety:

- U.S. Provisional Application No. 62/334,434, filed May 10, 2016, titled "Implementations for Voice Assistant on Devices";
- U.S. Provisional Application No. 62/336,551, filed May 13, 2016, titled "Personalized and Contextualized Audio Briefing";
- U.S. Provisional Application No. 62/336,566, filed May 13, 2016, titled "LED Design Language for Visual Affordance of Voice User Interfaces";
- U.S. Provisional Application No. 62/336,569, filed May 13, 2016, titled "Voice-Controlled Closed Caption Display"; and
- U.S. Provisional Application No. 62/336,565, filed May 13, 2016, titled "Media Transfer among Media Output Devices."

This application is also related to the following patent applications, each of which is incorporated by reference in its entirety:

- U.S. patent application Ser. No. 15/592,126, filed May 10, 2017, titled "Voice-Controlled Closed Caption Display";
- U.S. patent application Ser. No. 15/592,128, filed May 10, 2017, titled "Media Transfer among Media Output Devices";
- U.S. patent application Ser. No. 15/593,236, filed May 11, 2017, titled "Personalized and Contextualized Audio Briefing"; and
- U.S. patent application Ser. No. 15/592,137, filed May 10, 2017, titled "Implementations for Voice Assistant on Devices."

TECHNICAL FIELD

This application relates generally to computer technology, including but not limited to methods and systems for using an array of full color light emitting diodes (LEDs) to visualize a voice processing state associated with a voice activated electronic device that is used as a user interface in a smart home or media environment.

BACKGROUND

Electronic devices integrated with microphones have been widely used to collect voice inputs from users and implement different voice-activated functions according to the voice inputs. For example, many state-of-the-art mobile devices include a voice assistant system (e.g., Siri and Google Assistant) that is configured to use voice inputs to initiate a phone call, conduct a restaurant search, start routing on a map, create calendar events, add a post to a social network, recognize a song and complete many other tasks. The mobile devices often include display screens that allow the users who provide the voice inputs to check the status of the tasks requested via the voice inputs. However, when an electronic device having a relatively simple structure and made at a low cost is applied to implement similar voice activated functions as the mobile devices, use of a display screen would significantly increase the cost of the electronic device. Thus, there is a need to use a simple and low-cost user interface to indicate a status of voice input processing in an electronic device that includes one or more microphones and functions as a voice interface.

In addition, the voice activated functions currently implemented in mobile devices are limited to Internet-based functions that involve remote servers (e.g., a search engine, a social network server or a voice assistant server). The results of the voice activated functions are displayed on or used to control the mobile devices themselves, and do not impact any other remote or local electronic devices accessible to the user. Given that voice inputs are convenient for the user, it is beneficial to allow the user to use voice inputs to control the other electronic devices accessible to the user in addition to requesting the Internet-based functions limited between the remote servers and the mobile devices.

SUMMARY

Accordingly, there is a need to create a smart media environment or a smart home environment where an electronic device provides an eyes-free and hands-free voice interface to activate voice-activated functions on other media play devices or smart home devices coupled within the smart media or home environment. In some implementations of this application, a smart media environment includes one or more voice-activated electronic devices and multiple media display devices each disposed at a distinct location and coupled to a cast device (e.g., a set top box). Each voice-activated electronic device is configured to record a voice message from which a cloud cast service server determines a user voice request (e.g., a media play request, a media transfer request or a closed caption initiation request). The cloud cast service server then directs the user voice request to a destination cast device as indicated by the voice message. The voice-activate electronic device is also configured to display a visual pattern via an array of full color LEDs indicating a corresponding voice processing state. Similar arrangement could be used to control smart home devices to implement voice-activated functions in a smart home environment. Such methods optionally complement or replace conventional methods of requiring a user to use a remote control or a client device to control the media devices or the smart home devices in a smart media or home environment.

In accordance with one aspect of this application, a method is implemented at an electronic device for visually indicating a voice processing state. The electronic device includes an array of full color LEDs, one or more microphones, a speaker, a processor and memory storing at least one program for execution by the processor. The method includes collecting via the one or more microphones audio inputs from an environment in proximity to the electronic device, and processing the audio inputs. The processing includes one or more of identifying and responding to voice inputs from a user in the environment. The method further includes determining a state of the processing from among a plurality of predefined voice processing states, and for each of the full color LEDs, identifying a respective predetermined LED illumination specification associated with the determined voice processing state. The illumination specification includes one or more of an LED illumination duration, pulse rate, duty cycle, color sequence and brightness. The method further includes in accordance with the identified LED illumination specifications of the full color LEDs, synchronizing illumination of the array of full color LEDs to provide a visual pattern indicating the determined voice processing state.

In accordance with one aspect of this application, a method is executed at server system including a processor and memory storing at least one program for execution by the processor for playing media content on a media output device. The media content play method includes receiving a voice message recorded by an electronic device, and determining that the voice message includes a first media play request. The first media play request includes a user voice command to play media content on a destination media output device and a user voice designation of the media output device, and the user voice command includes at least information of a first media play application and the media content that needs to be played. The media content play method further includes in accordance with the voice designation of the media output device, identifying (e.g., in a device registry) a cast device associated in a user domain with the electronic device and coupled to the media output device. The cast device is configured to execute one or more media play applications for controlling the media output device to play media content received from one or more media content hosts. The media content play method further includes sending to the cast device a second media play request including the information of the first media play application and the media content that needs to be played, thereby enabling the cast device to execute the first media play application that controls the media output device to play the media content.

In accordance with another aspect of this application, a method is executed at a server system including a processor and memory storing at least one program for execution by the processor for initiating by voice display of closed captions (CC) for media content. The CC display media method includes receiving a voice message recorded by an electronic device, and determining that the voice message is a first closed caption initiation request. The first closed caption initiation request includes a user voice command to initiate closed captions and a user voice designation of a display device playing the media content for which closed captions are to be activated. The CC display method further includes in accordance with the designation of the display device, identifying (e.g., in a device registry) a cast device associated in a user domain with the electronic device and coupled to the designated display device. The cast device is configured to execute a media play application for controlling the designated display device to display media content received from a media content host. The CC display method further includes sending a second closed caption initiation request to the cast device coupled to the designated display device, thereby enabling the cast device to execute the media play application that controls the designated display device to turn on the closed captions of media content that is currently displayed on the designated display device and display the closed captions according to the second closed caption initiation request.

In accordance with another aspect of this application, a method is executed at a server system including a processor and memory storing at least one program for execution by the processor for moving media content display from a source media output device to a destination media output device. The media transfer method includes receiving a voice message recorded by an electronic device, and determining that the voice message includes a media transfer request. The media transfer request includes a user voice command to transfer media content that is being played to a destination media output device and a user voice designation of the destination media output device. The media transfer method further includes obtaining from a source cast device instant media play information of the media content that is currently being played. The instant play information includes at least information of a first media play application, the media content that is currently being played, and a temporal position related to playing of the media content. The media transfer method further includes in accordance with the voice designation of the destination media output device, identifying (e.g., in a device registry) a destination cast device associated in a user domain with the electronic device and coupled to the destination media output device, and the destination cast device is configured to execute one or more media play applications for controlling the destination media output device to play media content received from one or more media content hosts. The media transfer method further includes sending to the destination cast device a media play request including the instant media play information, thereby enabling the destination cast device to execute the first media play application that controls the destination media output device to play the media content from the temporal location.

In accordance with some implementations, a cast device includes means for performing the operations of any of the methods described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

FIG. 4C is a perspective view of a voice-activated electronic device 190 that shows speakers contained in a base of the electronic device 190 in an open configuration in accordance with some implementations.

FIGS. 4D and 4E are a side view and an expanded view of a voice-activated electronic device that shows electronic components contained therein in accordance with some implementations, respectively.

FIGS. 4F(1)-4F(4) show four touch events detected on a touch sense array of a voice-activated electronic device in accordance with some implementations.

FIG. 4F(5) shows a user press on a button on a rear side of the voice-activated electronic device in accordance with some implementations.

FIG. 12 is a flow diagram illustrating a method of initiating by voice play of media content on a media output device in accordance with some implementations.

Like reference numerals refer to corresponding parts throughout the several views of the drawings.

DESCRIPTION OF IMPLEMENTATIONS

Figure 1:
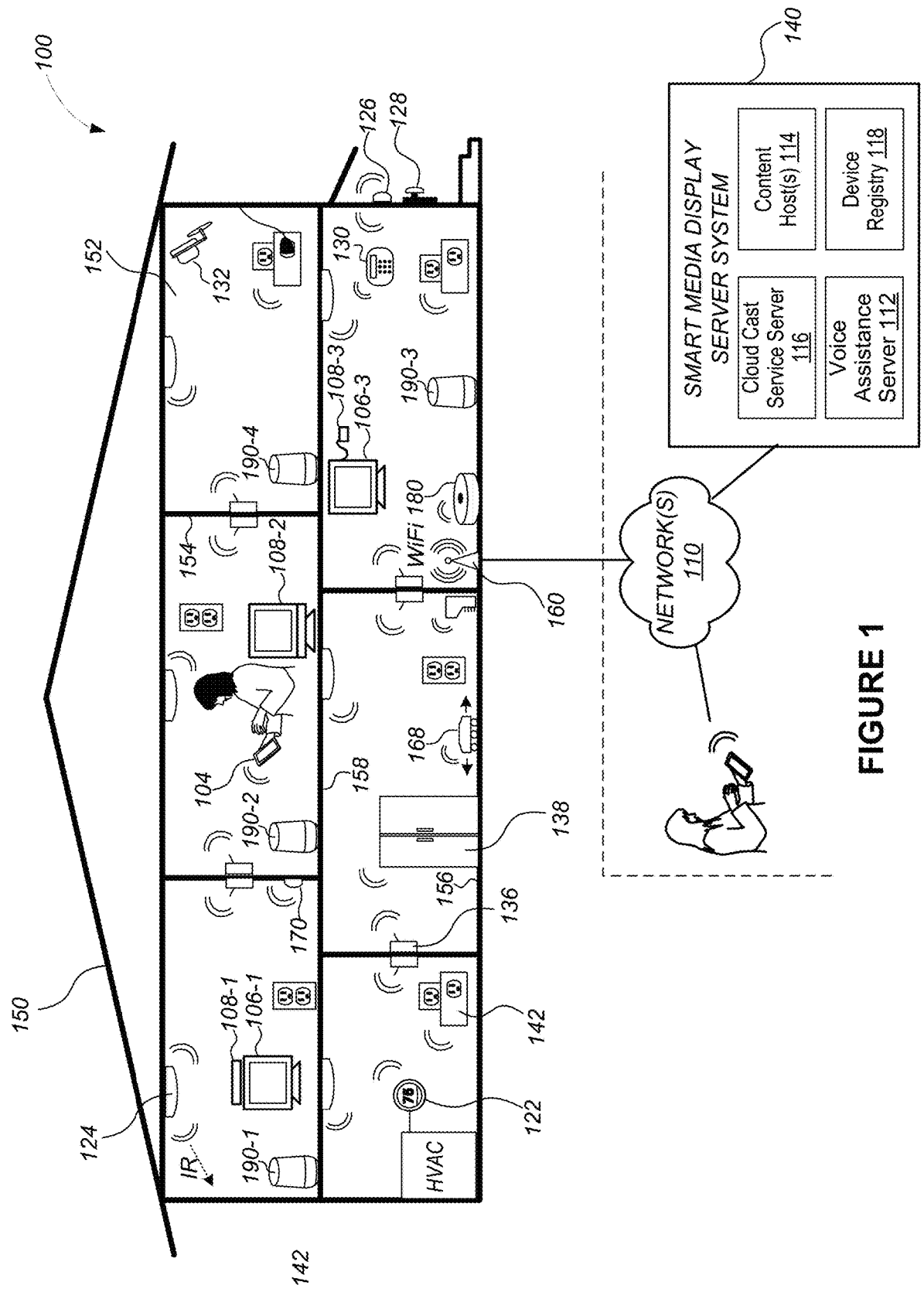
FIG. 1 is an example smart media environment in accordance with some implementations.

While digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes an array of full color light emitting diodes (LEDs). While the electronic device processes audio inputs collected from one or more microphones, the array of full LEDs are illuminated to provide a visual pattern according to LED illumination specifications determined according to a state of the processing. The array of full color LEDs is configured to provide a plurality of visual patterns each corresponding to a voice processing state (e.g., hot word detection, listening, thinking and speaking). This LED design language used to create the visual patterns is applied to at least partially resolve the problem of user confusion, apprehension, and uneasiness and promote understanding, adoption and enjoyment of the corresponding voice interface experience.

Further, in accordance with some implementations of the invention, a voice-activated electronic device uses voice inputs to initiate and control video playback on display devices. Specifically, a server system (e.g., a cloud cast service server) receives a voice message recorded by the voice-activated electronic device, and determines that the voice message includes a media play request further including a user voice command to play media content on a media output device (optionally including the voice-activated electronic device itself) and a user voice designation of the media output device. The user voice command includes at least information of a first media play application and the media content that needs to be played. In accordance with the voice designation of the media output device, the server system identifies a cast device associated in a user domain with the electronic device and coupled to the media output device, and the cast device is configured to execute one or more media play applications for controlling the media output device to play media content received from one or more media content hosts. The server system then sends to the cast device the information of the first media play application and the media content that needs to be played, thereby enabling the cast device to execute the first media play application that controls the media output device to play the media content.

In some implementations, while the media content is displayed on a media output device, the voice-activated electronic device allows a user to use their voice to turn on and off captions on the TV without involving any user interaction with a remote control or a second screen device (e.g., a mobile phone, a tablet computer and a laptop computer). Specifically, a server system is configured to determine from a voice message a first closed caption initiation request including a user voice command to initiate closed captions and a user voice designation of a display device playing the media content for which closed captions are to be activated. After identifying a cast device associated in a user domain with the electronic device and coupled to the designated display device, the server system sends a second closed caption initiation request to the cast device, thereby enabling the cast device to execute the media play application that controls the designated display device to turn on the closed captions of media content that is currently displayed on the designated display device and display the closed captions according to the second closed caption initiation request.

Further, in accordance with some implementations of the invention, while the media content is displayed on a first media output device, the voice-activated electronic device allows a user to use their voice to initiate a media transfer of the media content from the first media output device to a second media output device. The transfer maintains the corresponding media play state at least by resuming the media content on the second media output device at an exact point of the media content that has been played on the first media output device.

Specifically, a server system is configured to determine from a voice message a media transfer request including a user voice command to transfer media content that is being played to a destination media output device and a user voice designation of the destination media output device. The server system then obtains from a source cast device instant media play information of the media content that is currently being played, and the instant play information includes at least information of a first media play application, the media content that is currently being played, and a temporal position related to playing of the media content. After identifying a destination cast device associated in a user domain with the electronic device and coupled to the designated display device, the server system sends to the destination cast device a media play request including the instant media play information, thereby enabling the destination cast device to execute the first media play application that controls the destination media output device to play the media content from the temporal location. In some implementations, the destination cast device is identified in a device registry.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Smart Media/Home Environment

FIG. 1 is an example smart media environment 100 in accordance with some implementations. The smart media environment 100 includes a structure 150 (e.g., a house, office building, garage, or mobile home) with various integrated devices. It will be appreciated that devices may also be integrated into a smart media environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart media environment 100 to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 108. Examples of the media output devices 106 include, but are not limited to television (TV) display devices and music players. Examples of the cast devices 108 include, but are not limited to, a set-top boxes (STBs), DVD players and TV boxes. In the example smart media environment 100, the media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 are disposed in the smart media environment 100 to collect audio inputs for initiating various media play functions of the media devices. In some implementations, these voice-activated electronic devices 190 (e.g., devices 1901-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device.

The electronic device 190 includes at least one or more microphones, a speaker, a processor and memory storing at least one program for execution by the processor. The speaker is configured to allow the electronic device 190 to deliver voice messages to a location where the electronic device 190 is located in the smart media environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a conventional mobile device (e.g., a mobile phone or a tablet computer), its display screen is configured to display a notification concerning the state of audio input processing.

In accordance with some implementations, the electronic device 190 is a voice interface device that is network-connected to provide voice recognition functions with the aid of a cloud cast service server 116 and/or a voice assistance server 112. For example, the electronic device 190 includes a smart speaker that provides music to a user and allows eyes-free and hands-free access to voice assistant service (e.g., Google Assistant). Optionally, the electronic device 190 is one of a desktop or laptop computer, a tablet and a mobile phone that includes a microphone. Optionally, the electronic device 190 is a simple and low cost voice interface device. Given simplicity and low cost of the electronic device 190, the electronic device 190 includes an array of full color light emitting diodes (LEDs) rather than a full display screen, and displays a visual pattern on the full color LEDs to indicate the state of audio input processing.

When voice inputs from the electronic device 190 are used to control the media output devices 106 via the cast devices 108, the electronic device 190 effectively enables a new level of control of cast-enabled media devices. In a specific example, the electronic device 190 includes a casual enjoyment speaker with far-field voice access and functions as a voice interface device for Google Assistant. The electronic device 190 could be disposed in any room in the smart media environment 100. When multiple electronic devices 190 are distributed in multiple rooms, they become cast audio receivers that are synchronized to provide voice inputs from all these rooms.

Specifically, in some implementations, the electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself or on another connected media output device 106. For example, the user could issue a media play request by saying to the WiFi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played on a display device. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability.

In some implementations, a user may want to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a music track or a video clip where play of the media content was forgone on the first output device 106.

In some implementations, in addition to the media devices (e.g., the output devices 106 and the cast devices 108) and the voice-activated electronic devices 190, smart home devices could also be mounted on, integrated with and/or supported by a wall 154, floor 156 or ceiling 158 of the smart media environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

The smart home devices in the smart media environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart media environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart media environment 100 may additionally or alternatively include one or more other occupancy sensors (e.g., touch screens, IR sensors, ambient light sensors and motion detectors). In some implementations, the smart home devices in the smart media environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 136 and 138 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices via a wireless router. The cast devices 108, the electronic devices 190 and the smart home devices may further communicate with each other via a connection (e.g., network interface 160) to a network, such as the Internet 110. Through the Internet 110, the cast devices 108, the electronic devices 190 and the smart home devices may communicate with a smart server system 140 (also called a central server system and/or a cloud-computing system herein). Optionally, the smart server system 140 may be associated with a manufacturer, support entity, or service provider associated with the cast devices 108 and the media content displayed to the user.

Accordingly, the smart server system 140 may include a voice assistance server 112 that processes audio inputs collected by voice-activated electronic devices, one or more content hosts 104 that provide the displayed media content, a cloud cast service server 116 creating a virtual user domain based on distributed device terminals, and a device registry 118 that keeps a record of the distributed device terminals in the virtual user environment. Examples of the distributed device terminals include, but are not limited to the cast devices 108, the media output devices 106, the electronic devices 190 and the smart home devices. In some implementations, these distributed device terminals are linked to a user account (e.g., a Google user account) in the virtual user domain.

In some implementations, the network interface 160 includes a conventional network device (e.g., a router). The smart media environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart media environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2A:
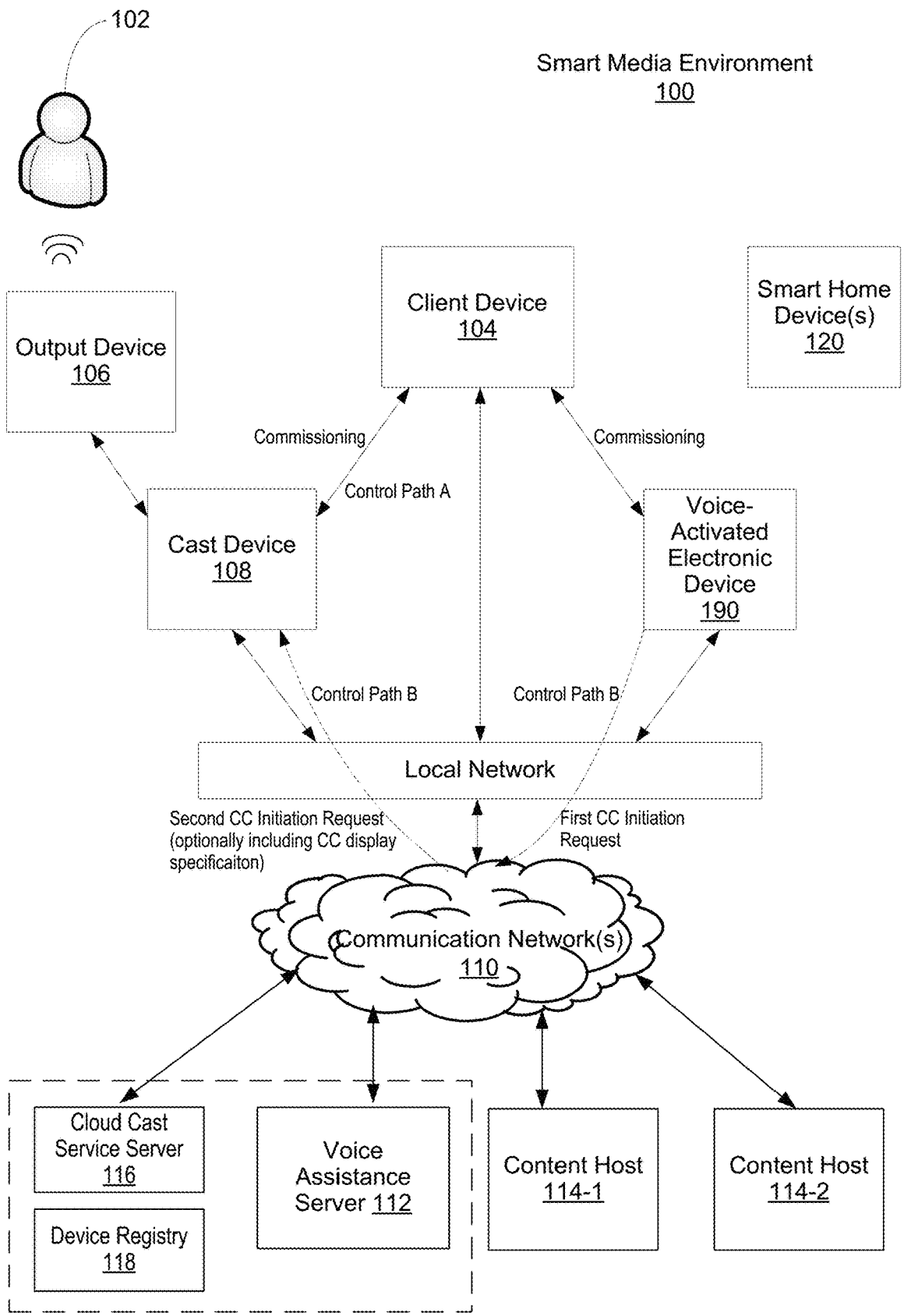
FIG. 2A is an example operating environment in which a voice-activated electronic device interacts with a cast device, a client device or a server system of a smart media environment in accordance with some implementations.

FIG. 2A is an example operating environment in which a voice-activated electronic device 190 interacts with a cast device 108, a client device 104 or a server system 140 of a smart media environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice assistance server 112 via the communication networks 110 for further processing. The cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in the device registry 118 in association with the user account.

In some implementations, the cast device 108 and the voice-activated electronic device 190 do not include any display screen, and have to rely on the client device 104 to provide a user interface during a commissioning process. Specifically, the client device 104 is installed with an application that enables a user interface to facilitate commissioning of a new cast device 108 or a new voice-activated electronic device 190 disposed in proximity to the client device 104. A user may send a request on the user interface of the client device 104 to initiate a commissioning process for the new cast device 108 or electronic device 190 that needs to be commissioned. After receiving the commissioning request, the client device 104 establishes a short range communication link with the new cast device 108 or electronic device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or electronic device 190. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new cast device 108 or electronic device 190 decodes and recovers the wireless configuration data, and joins the WLAN based on the wireless configuration data.

Additional user domain information is entered on the user interface displayed on the client device 104, and used to link the new cast device 108 or electronic device 190 to an account in a user domain. Optionally, the additional user domain information is conveyed to the new cast device 108 or electronic device 190 in conjunction with the wireless communication data via the short range communication link. Optionally, the additional user domain information is conveyed to the new cast device 108 or electronic device 190 via the WLAN after the new device has joined the WLAN.

Once the cast device 108 and the electronic device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the electronic device 190 is used to enable eyes-free and hands-free control of the cast device 108 and its associated media play activities (e.g., playback of media content play on the output device 106, and activation of closed captions of media content currently displayed on the output device 106).

Figure 2B:
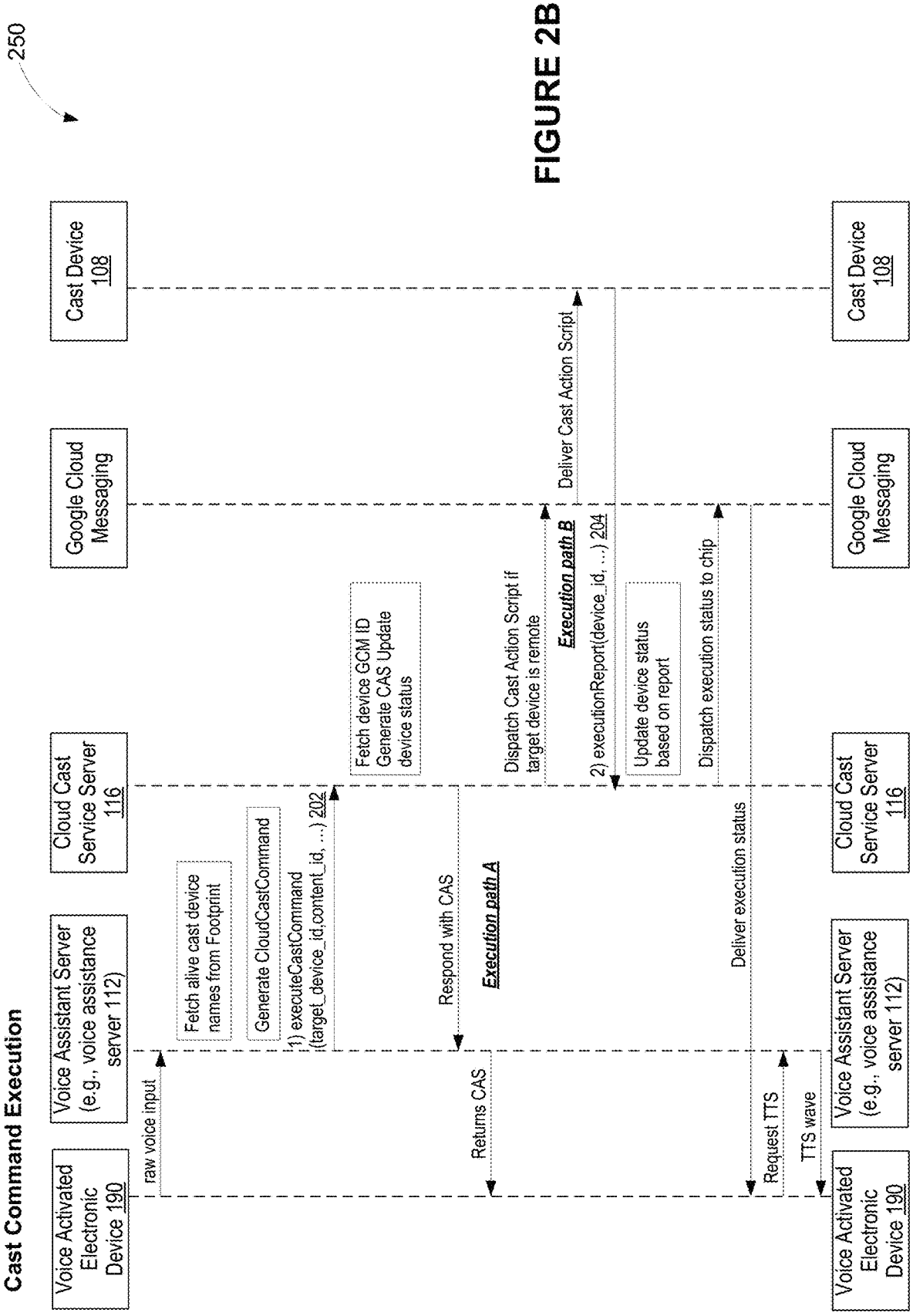
FIG. 2B is an example flow chart of a media play control process that controls the cast device and its associated media play activities according to control path B shown in FIG. 2A.

FIG. 2B is an example flow chart of a media play control process 250 that controls the cast device 108 and its associated media play activities according to control path B shown in FIG. 2A. An assistant server (e.g., a voice assistance server 112) is configured to support the voice activated electronic device 190, control interactions with a search stack and resolve which media action needs to be executed according to raw voice inputs collected by the electronic device 190. The assistant server sends (202) a request to the cloud cast service server 116 which converts the media action into an Action Script that can then be executed by the target cast device 108. There are two possible execution paths for the Action Script. In accordance with a first execution path A, it is returned in the response to the assistant server. This is a "local path." If the target cast device 108 is the voice-activated electronic device 190 itself, then the Action Script is readily available from the assistant server. Alternatively, in accordance with a second execution path B, the cloud cast service server 116 dispatches the Action Script to the device via a Cloud Messaging service. This is a remote execution path. In some implementations, both execution paths are taken in parallel, and the target cast device 108 ignores the Action Script that arrives second. A unique_command_id is associated with every Execute-CloudCastCommand.

In some implementations, a voice assistant server makes a remote procedure call (RPC) of executeCastCommand with a CloudCastCommand as follows:

```
message CloudCastCommand {
optional string unique_command_id = 1;
optional string source_device_id = 2 ;
optional string target_device_id = 3 ;
optional string app_id = 4 ;
optional string content_id = 5 ;
optional string content_auth_token = 6 ;
}
message ExecuteCastCommandRequest {
optional CloudCastCommand cast_command = 1 ;
}
message ExecuteCastCommandResponse {
optional CloudCastCommand cast_command = 1 ;
optional string cast_action_script = 2 ;
}
```

Once the command is obtained, the cloud cast service server 116 maintains this CloudCastCommand in a consistent storage keyed by a unique_command_id and target_device_id. The CloudCastCommand will be replaced or removed when another command is issued for the same target cast device 108 or the electronic device 190 or when/executionReport endpoints receives either SUCCESS/ERROR status. The cloud cast service server 116 then cleans up Command that is stale (haven't finished in a certain time period), and generates the Cast Action Script. Once Cast Action Script is generated, the cloud cast service server 116 returns the script in the RPC response, and sends the Response using Google Cloud Messaging Service if (source_device_id !=target_device_id).

In some implementations, the cast device 108 reports (204) its status during and after executing Cast Action Script as follows:

```
message ReportExecutionStatusRequest {
enum StatusCode {
UNKNOWN = 0 ;
SUCCESS = 1 ;
ERROR = 2 ;
QUEUED = 3 ;
IN_PROGRESS = 4 ;
}
optional string device_id = 1 ;
optional string unique_command_id = 2 ;
optional StatusCode status_code = 3 ;
// A single action in the action script that is being reported in this
// request.
optional string last_action = 4 ;
// Contains custom device status data based on status_code or error code.
// e.g. For "CAST::EINJECTWRAPPED" error_code, a custom error
string will be
// set in this field.
optional string custom_data = 5 ;
// Error code is a string which is defined in go/castactionscript
optional string error_code = 6 ;
}
message ExecutionReportResponse {
// TBD
}
```

In some implementations, the cast device 108 updates its status with a status message whenever its status changes. In some implementations, the cast device 108 periodically sends a heartbeat to inform the cloud cast service server 116 of their presence, and the cloud cast service server 116 updates a last_action_time field to the time since epoch in seconds. The cloud cast service server 116 sends the execution status message to source device (e.g. the voice-activated electronic device 190) optionally via a Cloud Messaging service. The voice-activated electronic device 190 will then call S3 for TTS and playback.

Voice Activated Media Play on a Media Output Device

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104 or other second screen device. For example, the user may give voice commands such as "Play Lady Gaga on Living Room speakers." A Lady Gaga music track or video clip is streamed to a cast device 108 associated with the "Living Room speakers." The client device 104 is not involved, nor is any cast device application or media play application loaded on the client device 104.

The cloud cast service 116 is the proxy service that communicatively links the voice-activated electronic device to the cast device 108 and makes casting to the cast device 108 possible without involving any applications on the client device 104. Specifically, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to a voice assistance server 112 via the communication networks 110 for further processing. A cloud cast service server 116 determines that the voice message includes a first media play request, and that the first media play request includes a user voice command to play media content on a media output device 106 and a user voice designation of the media output device 106. The user voice command further includes at least information of a first media play application (e.g., YouTube and Netflix) and the media content (e.g., Lady Gaga music) that needs to be played.

In accordance with the voice designation of the media output device, the cloud cast service server 116 in a device registry 118 a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

Voice Activated Closed Caption Display

U.S. Federal Accessibility Laws require that electronic communications and information technologies, such as websites, email, or web documents, be accessible, and that video content must be presented with an option of closed captions for users who are deaf or hard of hearing. Referring to FIG. 2A, after the cast device 108 and the voice-activated electronic device 190 are both commissioned and linked to a common user domain, the voice-activated electronic device 190 can be used as a voice user interface to enable eyes-free and hands-free control of closed caption display with media content that is being currently displayed on the media output device 106. Specifically, a voice recognition system translates a voice command to turn captions on to a recognizable message sent to the cloud cast service. The cloud cast service interprets this message and send a command to a media play application (e.g., YouTube) installed on a cast device. The media play application receives that command and renders a caption track based on the message. As such, the user can then use voice to toggle captions on and off on the media output devices. This control of closed caption display does not involve any remote control, client device 104 or other second screen device, nor does it invoke any cast device application or media play application loaded on the client device 104. Therefore, the voice-activated control of closed caption display meets the federal accessibility requirements particularly for users who are deaf or hard of hearing.

When a user intends to initiate display of closed captions for currently displayed media content, the user sends a voice message (e.g., "Turn on closed captioning.") recorded by an electronic device 190. Optionally, the electronic device 190 partially processes the voice message locally. Optionally, the electronic device 190 transmits the voice message or the partially processed voice message to a voice assistance server 112 for further processing. A cloud cast service server 116 determines that the voice message is a first closed caption initiation request, and that the first closed caption initiation request includes a user voice command to initiate closed captions and a user voice designation of a display device 106 playing the media content for which closed captions are to be activated. In some implementations, the electronic device 190 transmits the recorded voice message to the cloud cast service server 116 directly. The cloud cast service server 116 determines that the voice message is the first closed caption initiation request by forwarding the voice message to the voice assistance server 112 to parse the voice message and identify the user voice command and the user voice designation of the destination media device, and receiving from the voice assistance server 112 the user voice command and the user voice designation of the destination media device.

In accordance with the designation of the display device, the cloud cast service server 116 identifies in a device registry 118 a cast device 108 associated in the user domain with the electronic device 190 and coupled to the designated display device 106. The cast device 108 is configured to execute a media play application for controlling the designated display device to display media content received from a media content host. In some implementations, both the electronic device 190 and the cast device 108 are associated with a user account of the user domain. The user account could be a Google user account.

Then, the cloud cast service server 116 sends a second closed caption initiation request to the cast device coupled to the designated display device. Upon receiving the information sent by the cloud cast service server 116, the cast device 108 executes the media play application to control the designated display device 106 to turn on the closed captions of media content that is currently displayed on the designated display device 106 and display the closed captions according to the second closed caption initiation request. In some implementations, the closed captions are displayed on the designated display device according to a default closed caption display specification.

In some implementations, in accordance with the first closed caption initiation request, the cloud cast service server 116 determines a display specification of the closed captions. The second closed caption initiation request includes the display specification of the closed caption, and the cast device is configured to execute the media play application to control the display device to display the closed captions according to the display specification. Further, in some implementations, the display specification of the closed captions includes at least one of a font (e.g., Arial), a font size (e.g., 12), a font color (e.g., white) and a background color (e.g., Black). Further, in some implementations, sending the display specification of the closed captions via the cloud cast service server 116 allows users to adjust the format of their closed captions by translating custom voice commands (such as "larger captions" or "change the background color to blue") to update the closed caption initiation request sent to the cast device 108. Additionally, such voice-activated control of closed caption display allows any electronic device with a microphone (e.g., a mobile phone) to initiate playback of media content and adjust closed captions on the media display device 106.

In some implementations, the electronic device, the cast device and the designated display device are disposed in proximity to each other, but are located remotely from the cloud cast service system 116, the voice assistance server 112 and the device registry 118. In some implementations, two or more of the cloud cast service system 116, the voice assistance server 112 and the device registry 118 are integrated in a single server. In some implementations, the cloud cast service system 116, the voice assistance server 112 and the device registry 118 are distinct from a content host 114 that provides the media content to the cast device 108 for display on the designated display device 106.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

Voice Activated Media Transfer Among Media Output Devices

Figure 3:
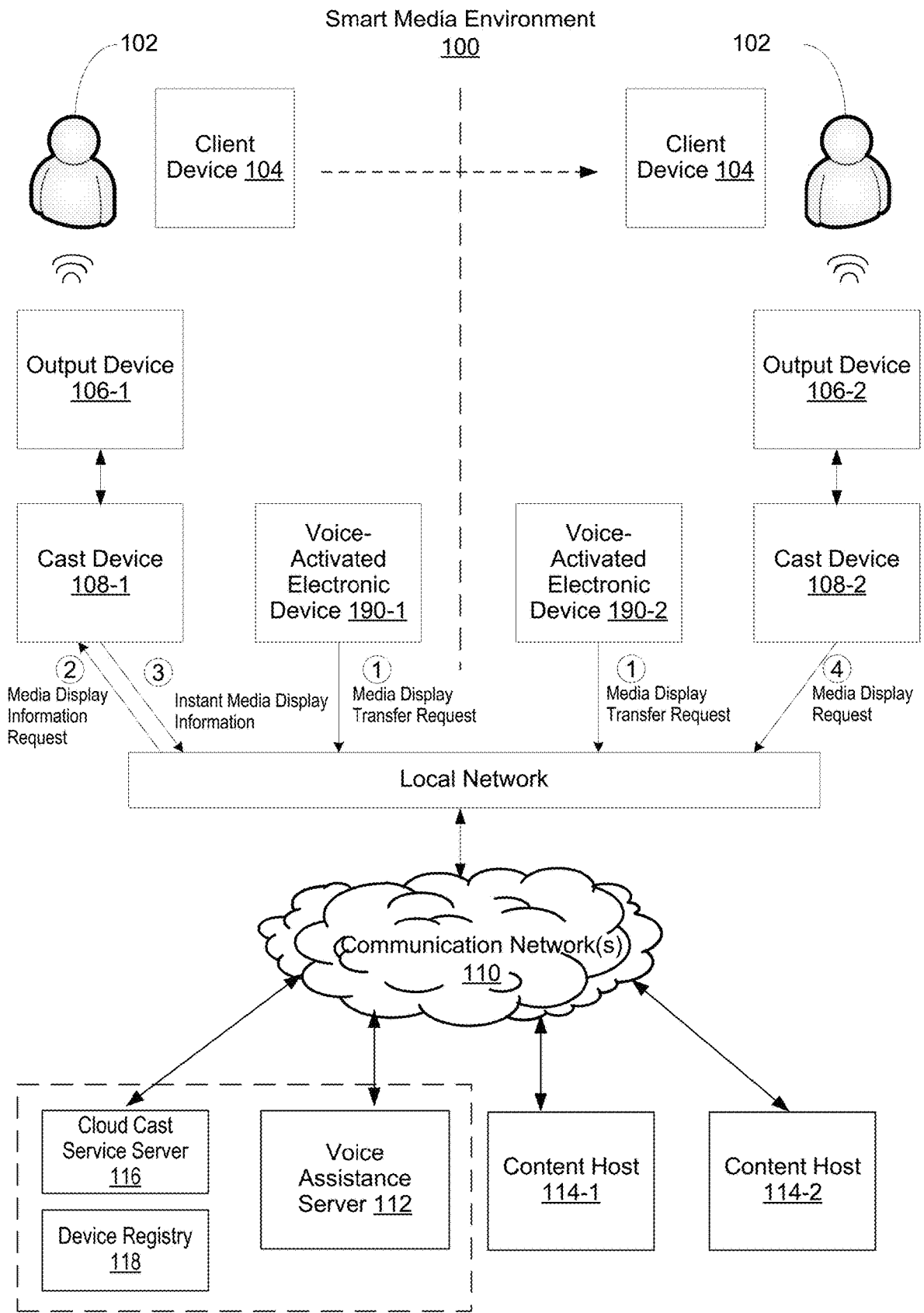
FIG. 3 is another example operating environment in which cast devices interact with a client device, voice-activated electronic devices or a server system of the smart media environment in accordance with some implementations.

FIG. 3 is another example operating environment in which cast devices 108 interact with a client device 104, voice-activated electronic devices 190 or a server system of the smart media environment 100 in accordance with some implementations. The smart media environment 100 includes a first cast device 108-1 and a first output device 106-1 coupled to the first cast device. The smart media environment 100 also includes a second cast device 108-2 and a second output device 106-2 coupled to the first cast device. The cast devices 108-1 and 108-2 are optionally located in the same location (e.g., the living room) or two distinct locations (e.g., two rooms) in the smart media environment 100. Each of the cast devices 108-1 and 108-2 is configured to obtain media content or Internet content from media hosts 114 for display on the output device 106 coupled to the respective cast device 108-1 or 108-2. Both the first and second cast devices are communicatively coupled to the cloud cast service server 116 and the content hosts 114.

The smart media environment 100 further includes one or more voice-activated electronic devices 190 that are communicatively coupled to the cloud cast service server 116 and the voice assistance server 112. In some implementations, the voice-activated electronic devices 190 are disposed independently of the cast devices 108 and the output devices 106. For example, as shown in FIG. 1, the electronic device 190-4 is disposed in a room where no cast device 108 or output device 106 is located. In some implementations, the first electronic device 190-1 is disposed in proximity to the first cast device 108-1 and the first output device 106-1, e.g., the first electronic device 190-1, the first cast device 108-1 and the first output device 106-1 are located in the same room. Optionally, the second electronic device 190-2 is disposed independently of or in proximity to the second cast device 108-2 and the second output device 106-2.

When media content is being played on the first output device 106-1, a user may send a voice command to any of the electronic devices 190 to request play of the media content to be transferred to the second output device 106-2. The voice command includes a media play transfer request. In one situation, the user could issue the voice command to the electronic device 190-1 disposed in proximity to the first cast device 108-1 before the user moves to a destination location. Alternatively, in another situation, the user could issue the voice command to the electronic device 190-2 disposed in proximity to the second device 108-2 after the user reaches the destination location.

The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the cloud cast service server 116 the requested instant play information including at least information of a first media play application (e.g., YouTube), the media content that is currently being played (e.g., "Lady Gaga-National Anthem-Super Bowl 2016"), and a temporal position related to playing of the media content. The second cast device 108-2 then receives a media display request including the instant play information from the cloud cast service server 116, and in accordance with the instant play information, executes the first media play application that controls the second output device 106-2 to play the media content from the temporal location.

In a specific example, when a music playlist is played on the first output device 106-1, the user says "Play on my living room speakers." The first output device 106-1 stops playing the currently played song, and the stopped song resumes on the living room speakers. When the song is completed, the living room speakers continue to play the next song on the music playlist previously played on the first output device 106-1. As such, when the user is moving around in the smart home environment 100, the play of the media content would seamlessly follow the user while only involving limited user intervention (i.e., giving the voice command). Such seamless transfer of media content is accomplished according to one or more of the following operations:

A voice assistant service (e.g., a voice assistance server 112) recognizes that it is a user voice command to transfer media from one output device (source) to another output device (destination);

The Assistant service passes a message including the user voice command to the cloud cast service server 116;

The cloud cast service server 116 then asks the source output device 106-1 to provide a blob of data that is needed for transferring the media stream;

The content of the blob of data is partner dependent but it typically contains the current media content being played, the position with the current media content and the stream volume of the current media content;

Optionally, the content of the blob of data include information of a container for the current media content (e.g., the playlist to which the media content belong), and a position of the current media content within the playlist;

The cloud cast service server 116 tells the source device to stop playing the media content;

The cloud cast service server 116 then loads the appropriate receiver application (e.g., media play application) on the destination (i.e. the same receiver application that is running on the source output device);

The cloud cast service server 116 sends this blob of data to the destination cast device 108-2 along with an instruction to the receiver application to resume transfer of the media content; and The receiver application interprets the data blob to resume the media content accordingly.

Specifically, on a server side, a method is implemented by the cloud cast service server 116 for moving play of media content display from a source media output device to a destination media output device. The cloud cast service server 116 receives a voice message recorded by an electronic device 190-1 or 190-2, and determines that the voice message includes a media transfer request. As explained above, the electronic device could be disposed in proximity to the source cast device 108-1 located at a first location, in proximity to the destination cast device 108-2 located at a second location, or independently of both the source and destination cast devices. In some implementations, the electronic devices 190, the source cast device 108-1 and the destination cast device 108-2 are associated a user account in a user domain managed by the cloud cast service server 116. The user account could be a Google user account.

The media transfer request in the user voice command includes a user voice command to transfer media content that is being played to a destination media output device 190-2 and a user voice designation of the destination media output device 190-2. In some implementations, after receiving the voice message recorded by an electronic device 190-1 or 190-2, the cloud cast service server 116 forwards the voice message to a voice assistance server 112 that parses the voice message and identifies the user voice command and the voice designation of the destination media output device, and receives from the voice assistance server 112 the user voice command and the voice designation of the destination media output device 106-2.

The cloud cast service server 116 obtains from a source cast device 108-1 instant media play information of the media content that is currently being played. The instant play information includes at least information of a first media play application, the media content that is currently being played, and a temporal position related to playing of the media content. The temporal position could be recorded when the user requests the move of the media content to the destination output device 106-2. In some implementations, the cloud cast service server 116 identifies that the media content is currently being played at the source media output device 106-1. The cloud cast service server 116 identifies in the device registry 118 the source cast device 108-1 associated in the user domain with the electronic device 190 and coupled to the source media output device 106-1. Then, the cloud cast service server 116 sends a media information request to the source cast device 108-1, and thereby receives the instant media play information from the source cast device 108-1.

In accordance with the voice designation of the destination media output device, the cloud cast service server 116 identifies in a device registry 118 a destination cast device 108-2 associated in a user domain with the electronic device 190 and coupled to the destination media output device 106-2. The destination cast device 108-2 is configured to execute one or more media play applications for controlling the destination media output device 106-2 to play media content received from one or more media content hosts 114. In some implementations, the user voice designation of the destination media output device 106-2 includes description of the destination media output device 106-2 (e.g., a brand and a location of the output device 106-2). The cloud cast service server 116 identifies in the registry 112 the destination media output device 106-2 among a plurality of media output devices according to the description of the destination media output device 106-2. Thus, the user does not have to provide an accurate device identification that matches the record in the device registry 112, and the cloud cast service server 116 can determine the destination media output device 106-2 based on the description of the destination media output device 106-2.

After obtaining the instant play information and identifying the destination cast device 108-2, the cloud cast service server 116 sends to the destination cast device 108-2 a media play request including the instant media play information, thereby enabling the destination cast device 108-2 to execute the first media play application that controls the destination media output device 106-2 to play the media content from the temporal location. In some implementations, in accordance with the user voice command, the cloud cast service server 116 sends also sends a media stop request to the source cast device 108-1, thereby enabling the source cast device 108-1 to execute the first media play application that controls the source cast device 108-1 coupled thereto to forgo the play of the media content on the source media output device 106-1.

This media transfer method abstracts the data needed to transfer a media stream away from the service and places it directly with the streaming service provider so they can define the parameters (e.g., a Google cast protocol) needed to transfer the stream currently playing. This keeps the design of this invention very flexible to accommodate any type of media partner or media stream. Additionally it leverages cloud infrastructure (via the cloud cast service) to transfer messages and coordinate playback between the source and destination devices. This allows this transfer to occur without these cast devices having any knowledge of each other or being on the same wireless local area network.

Media transfer via the cloud cast service server 116 also enables scalability, flexibility and data security. The blob of data needed to transfer media is specifically loosely defined to accommodate the number of content provider partners and the number of stream types. Streams may be individual tracks, playlists, live streams, advertisements, autoplaying videos and many other content formats. Keeping the data blob flexible and partner dependent allows a single method to work for all types of media streams. Further, by having the cloud cast service independently connect with the source and destination cast devices, there is no requirement for these devices to be connected to each other, be on the same WLAN or have knowledge of each other. In addition, there is no disintermediation by the CCS. The data being sent between the receiver applications on the source and the destination is opaque to the cloud cast service server 116. This allows confidential details about the transferred media session to stay with the partner who employs the cloud cast service.

Physical Features of a Voice-Activated Electronic Device

Figure 4B:
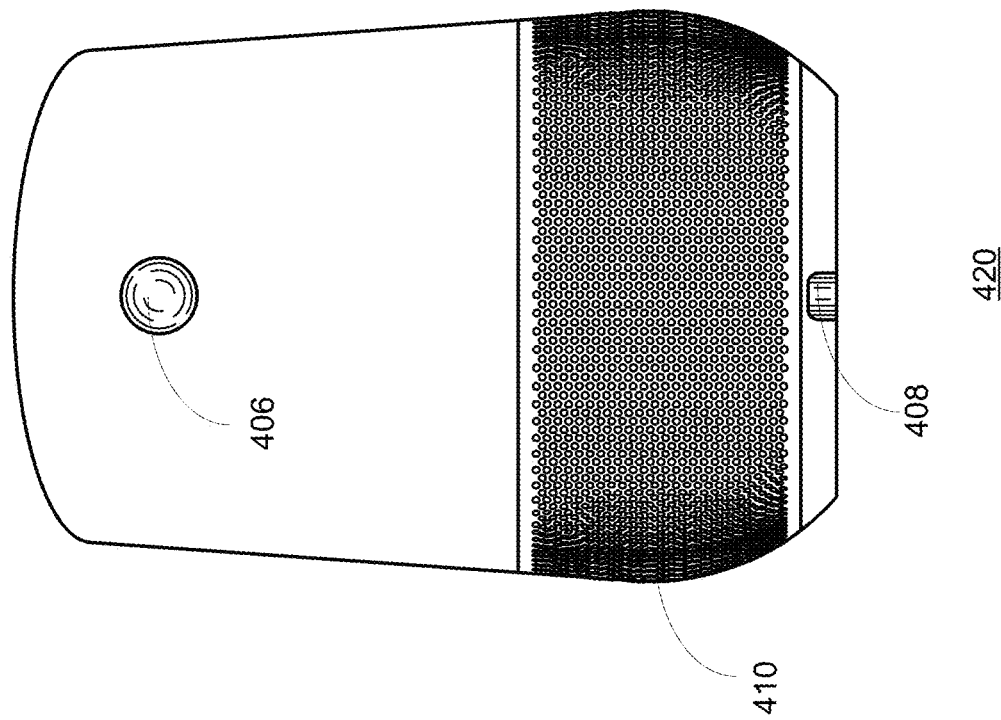
FIGS. 4A and 4B are a front view and a rear view of a voice-activated electronic device in accordance with some implementations.
Figure 4A:
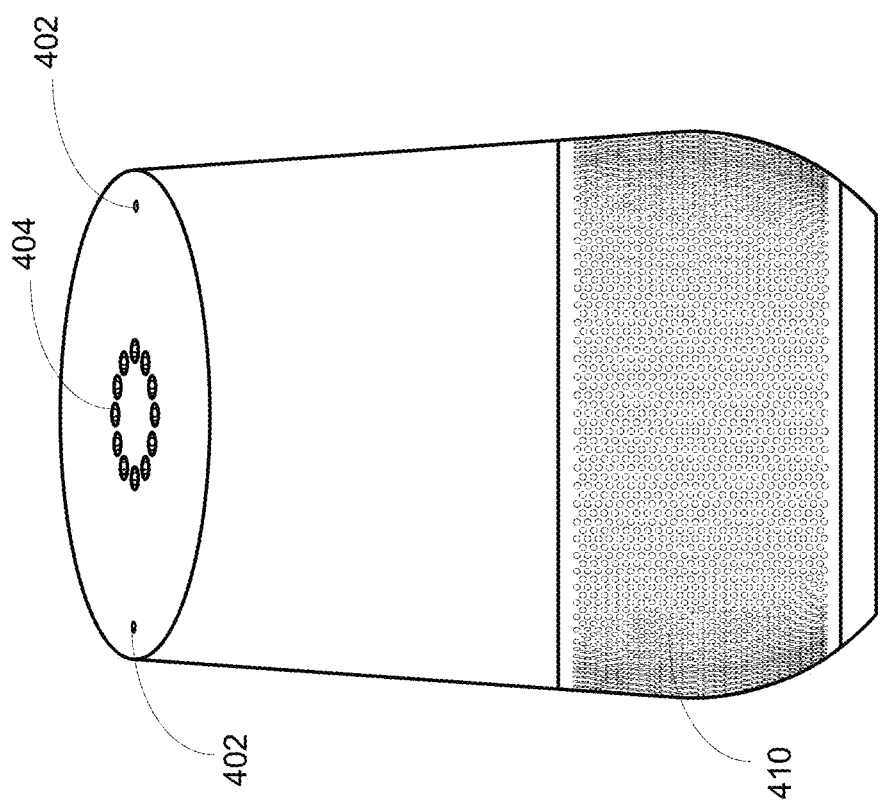

FIGS. 4A and 4B are a front view 400 and a rear view 420 of a voice-activated electronic device 190 in accordance with some implementations. The electronic device 190 is designed as warm and inviting, and fits naturally in many areas of a home. The electronic device 190 includes one or more microphones 402 and an array of full color LEDs 404. The full color LEDs 404 could be hidden under a top surface of the electronic device 190 and invisible to the user when they are not lit. In some implementations, the array of full color LEDs 404 is physically arranged in a ring. Further, the rear side of the electronic device 190 optionally includes a power supply connector 408 configured to couple to a power supply.

In some implementations, the electronic device 190 presents a clean look having no visible button, and the interaction with the electronic device 190 is based on voice and touch gestures. Alternatively, in some implementations, the electronic device 190 includes a limited number of physical buttons (e.g., a button 406 on its rear side), and the interaction with the electronic device 190 is further based on press on the button in addition to the voice and touch gestures.

Figure 4E:
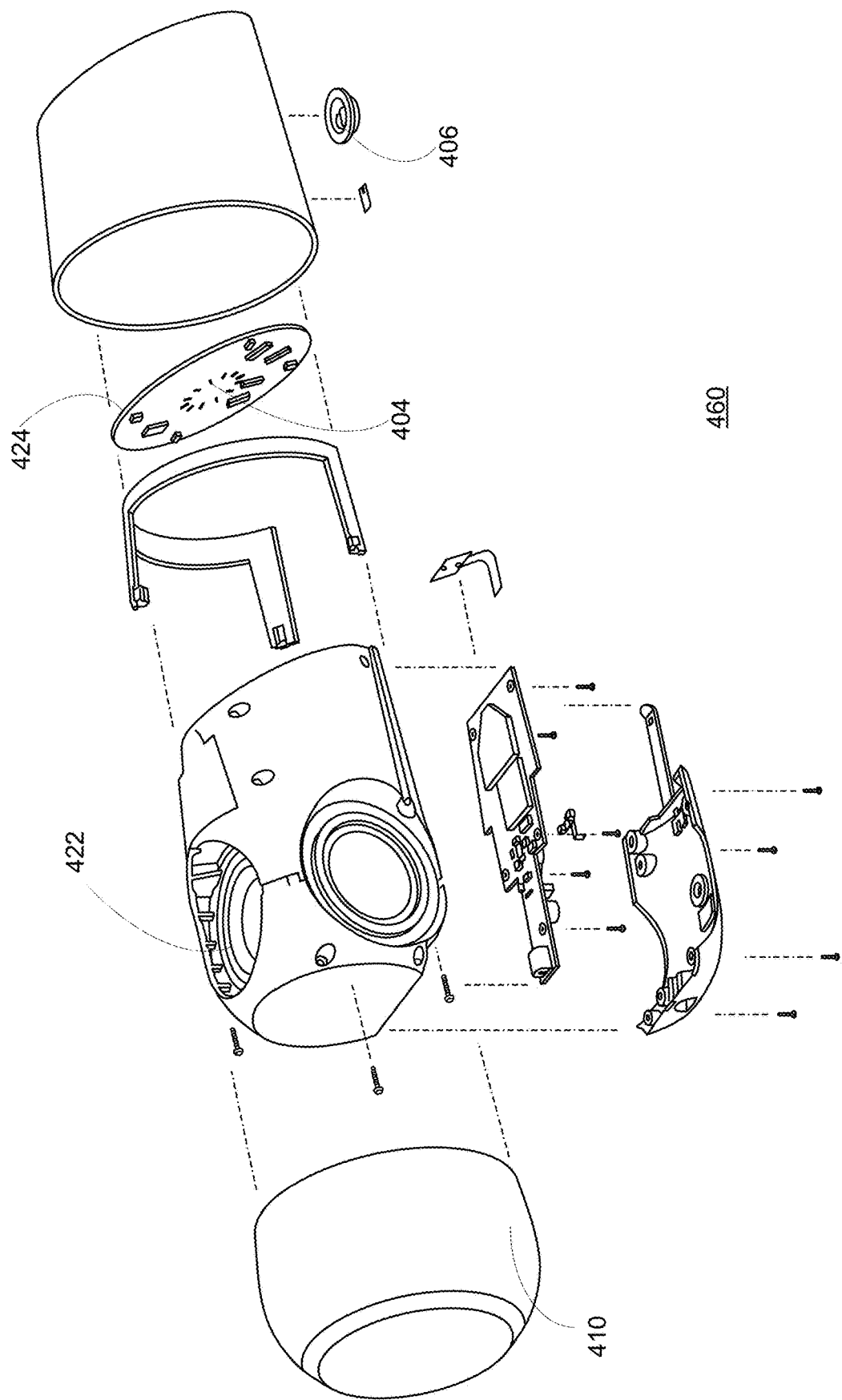

One or more speakers are disposed in the electronic device 190. FIG. 4C is a perspective view 440 of a voice-activated electronic device 190 that shows speakers 422 contained in a base 410 of the electronic device 190 in an open configuration in accordance with some implementations. FIGS. 4D and 4E are a side view 450 and an expanded view 460 of a voice-activated electronic device 190 that shows electronic components contained therein in accordance with some implementations, respectively. The electronic device 190 includes an array of full color LEDs 404, one or more microphones 402, a speaker 422, Dual-band WiFi 802.11ac radio(s), a Bluetooth LE radio, an ambient light sensor, a USB port, a processor and memory storing at least one program for execution by the processor.

Further, in some implementations, the electronic device 190 further includes a touch sense array 424 configured to detect touch events on the top surface of the electronic device 190. The touch sense array 424 is disposed and concealed under the top surface of the electronic device 190. In some implementations, the touch sense array 424 arranged on a top surface of a circuit board including an array of via holes, and the full color LEDs are disposed within the via holes of the circuit board. When the circuit board is positioned immediately under the top surface of the electronic device 190, both the full color LEDs 404 and the touch sense array 424 are disposed immediately under the top surface of the electronic device 190 as well.

FIGS. 4F(1)-4F(4) show four touch events detected on a touch sense array 424 of a voice-activated electronic device 190 in accordance with some implementations. Referring to FIGS. 4F(1) and 4F(2), the touch sense array 424 detects a rotational swipe on a top surface of the voice activated electronic 190. In response to detection of a clockwise swipe, the voice activated electronic 190 increases a volume of its audio outputs, and in response to detection of a counterclockwise swipe, the voice activated electronic 190 decreases the volume of its audio outputs. Referring to FIG. 4F(3), the touch sense array 424 detects a single tap touch on the top surface of the voice activated electronic 190. In response to detection of a first tap touch, the voice activated electronic 190 implements a first media control operation (e.g., plays specific media content), and in response to detection of a second tap touch, the voice activated electronic 190 implements a second media control operation (e.g., pauses the specific media content that is currently being played). Referring to FIG. 4F(4), the touch sense array 424 detects a double tap touch (e.g., two consecutive touches) on the top surface of the voice activated electronic 190. The two consecutive touches are separated by a duration of time less than a predetermined length. However, when they are separated by a duration of time greater than the predetermined length, the two consecutive touches are regarded as two single tap touches. In response to detection of the double tap touch, the voice activated electronic 190 initiates a hot word detection state in which the electronic device 190 listens to and recognizes one or more hot words (e.g., predefined key words). Until the electronic device 190 recognizes the hot words, the electronic device 190 does not send any audio inputs to the voice assistance server 112 or the cloud cast service server 118.

In some implementations, the array of full color LEDs 404 is configured to display a set of visual patterns in accordance with an LED design language, indicating detection of a clockwise swipe, a counter-clockwise swipe, a single tap or a double tap on the top surface of the voice activated electronic 190. For example, the array of full color LEDs 404 may light up sequentially to track the clockwise or counter-clockwise swipe as shown in FIGS. 4F(1) and 4F(2), respectively. More details on visual patterns associated with voice processing states of the electronic device 190 are explained below with reference to FIGS. 4G and 4H(1)-4H(8).

FIG. 4F(5) shows an example user touch or press on a button 406 on a rear side of the voice-activated electronic device 190 in accordance with some implementations. In response to a first user touch or press on the button 406, microphones of the electronic device 190 are muted, and response to a second user touch or press on the button 406, the microphones of the electronic device 190 are activated.

LED Design Language for Visual Affordance of Voice User Interface

In some implementations, given simplicity and low cost of the electronic device 190, the electronic device 190 includes an array of full color light emitting diodes (LEDs) rather than a full display screen. A LED design language is adopted to configure illumination of the array of full color LEDs and enable different visual patterns indicating different voice processing state of the electronic device 190. The LED Design Language consists of a grammar of colors, patterns, and specific motion applied to a fixed set of full color LEDs. The elements in the language are combined to visually indicate specific device states during the use of the electronic device 190. In some implementations, illumination of the full color LEDs aims to clearly delineate the passive listening and active listening states of the electronic device 190 among other important states. Placement of the full color LEDs complies with physical constraints of the electronic device 190, and the array of full color LEDs could be used in a speaker that is made by a third party original equipment manufacturer (OEM) based on specific technology (e.g., Google Assistant).

When the array of full color LEDs is used in a speaker that is made by a third party OEM based on specific technology, the full color LEDs and the LED design language are configured to fit a corresponding physical user interface of the OEM speaker. In this situation, device states of the OEM speaker remain the same, while specific visual patterns representing the device states could be varied (for example, the colors of the full color LEDs could be different but are displayed with similar animation effects).

In a voice-activated electronic device 190, passive listening occurs when the electronic device 190 processes audio inputs collected from its surrounding environment but does not store the audio inputs or transmit the audio inputs to any remote server. In contrast, active listening occurs when the electronic device 190 stores the audio inputs collected from its surrounding environment and/or shares the audio inputs with a remote server. In accordance with some implementations of this application, the electronic device 190 only passively listens to the audio inputs in its surrounding environment without breaching privacy of users of the electronic device 190.

Figure 4G:
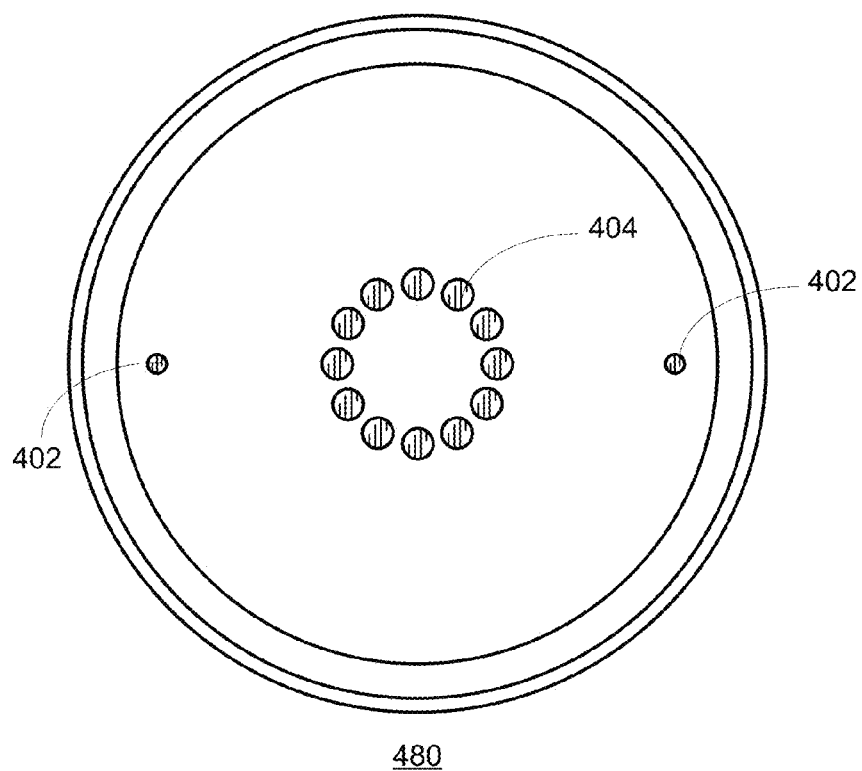
FIG. 4G is a top view of a voice-activated electronic device in accordance with some implementations.
Figure 4H:
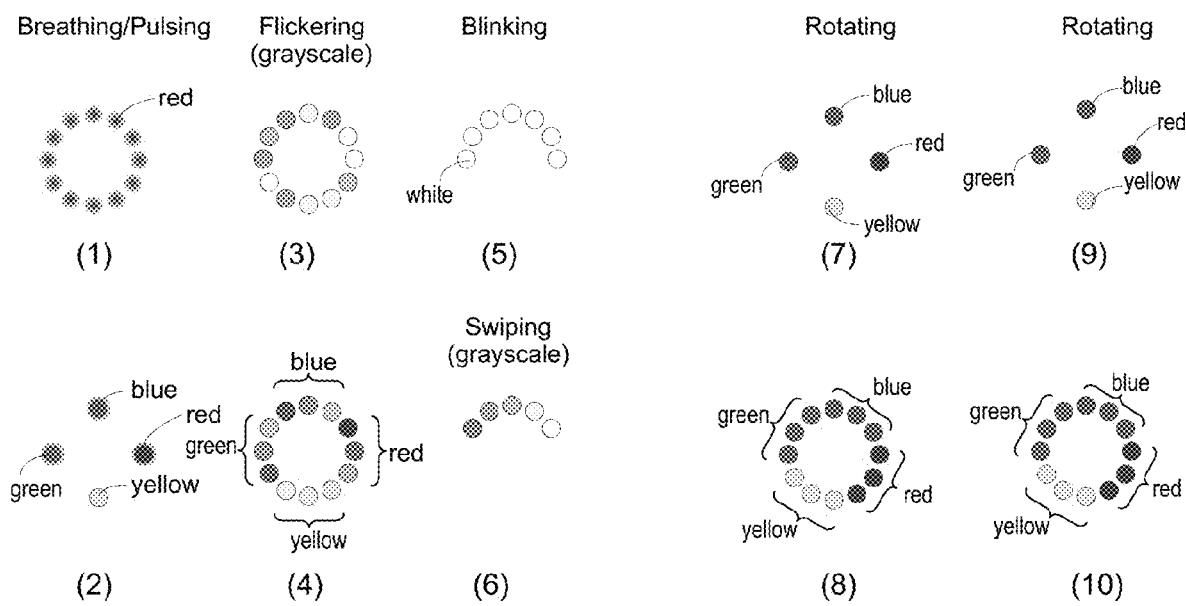
FIG. 4H shows six example visual patterns displayed by an array of full color LEDs for indicating voice processing states in accordance with some implementations.

FIG. 4G is a top view of a voice-activated electronic device 190 in accordance with some implementations, and FIG. 4H shows six example visual patterns displayed by an array of full color LEDs for indicating voice processing states in accordance with some implementations. In some implementations, the electronic device 190 does not include any display screen, and the full color LEDs 404 provide a simple and low cost visual user interface compared with the a full display screen. The full color LEDs could be hidden under a top surface of the electronic device and invisible to the user when they are not lit. Referring to FIGS. 4G and 4H, in some implementations, the array of full color LEDs 404 are physically arranged in a ring. For example, as shown in FIG. 4H(6), the array of full color LEDs 404 may light up sequentially to track the clockwise or counter-clockwise swipe as shown in FIGS. 4F(1) and 4F(2), respectively A method is implemented at the electronic device 190 for visually indicating a voice processing state. The electronic device 190 collects via the one or more microphones 402 audio inputs from an environment in proximity to the electronic device, and processes the audio inputs. The processing includes one or more of identifying and responding to voice inputs from a user in the environment. The electronic device 190 determines a state of the processing from among a plurality of predefined voice processing states. For each of the full color LEDs 404, the electronic device 190 identifies a respective predetermined LED illumination specification associated with the determined voice processing state. The illumination specification includes one or more of an LED illumination duration, pulse rate, duty cycle, color sequence and brightness. In some implementations, the electronic device 190 determines that the voice processing state is associated with one of a plurality of users, and identifies the predetermined LED illumination specifications of the full color LEDs 404 by customizing at least one of the predetermined LED illumination specifications (e.g., the color sequence) of the full color LEDs 404 according to an identity of the one of the plurality of users.

Further, in some implementations, in accordance with the determined voice processing state, the colors of the full color LEDs include a predetermined set of colors. For example, referring to FIGS. 4H(2), 4H(4) and 4H(7)-(10), the predetermined set of colors include Google brand colors including blue, green, yellow and red, and the array of full color LEDs is divided into four quadrants each associated with one of the Google brand colors.

In accordance with the identified LED illumination specifications of the full color LEDs, the electronic device 190 synchronizes illumination of the array of full color LEDs to provide a visual pattern indicating the determined voice processing state. In some implementations, the visual pattern indicating the voice processing state includes a plurality of discrete LED illumination pixels. In some implementations, the visual pattern includes a start segment, a loop segment and a termination segment. The loop segment lasts for a length of time associated with the LED illumination durations of the full color LEDs and configured to match a length of the voice processing state.

In some implementations, the electronic device 190 has more than twenty different device states (including the plurality of predefined voice processing states) that are represented by the LED Design Language. Optionally, the plurality of predefined voice processing states includes one or more of a hot word detection state, a listening state, a thinking state and a responding state.

1. Hot Word Detection State and Listening State

In some implementations, the electronic device 190 listens to and recognizes one or more hot words (e.g., predefined key words) in the hot word detection state. Until the electronic device 190 recognizes the hot words, the electronic device 190 does not send any audio inputs to the voice assistance server 112 or the cloud cast service server 118. Upon the detection of the hot words, the electronic device 190 starts to operate in the listening state when the microphones records audio inputs that are further transmitted to the cloud for further processing. In the listening mode, the audio inputs starting from a predetermined temporal position (e.g., two seconds before detection of the hot word) is transmitted to the voice assistance server 112 or the cloud cast service server 118, thereby facilitating seamless queries for a more natural conversation-like flow.

Accordingly, in some implementations, in accordance with a determination that the determined voice processing state is a hot word detection state that occurs when one or more predefined hot words are detected, the array of full color LEDs is divided into a plurality of diode groups that are alternately arranged and configured to be lit sequentially, and diodes in each of the plurality of diode groups are lit with different colors. Further, in some implementations, in accordance with a determination that the determined voice processing state is a listening state that occurs when the electronic device is actively receiving the voice inputs from the environment and providing received voice inputs to a remote server, all full color LEDs are lit up with a single color, and each full color LED illuminates with different and varying brightness.

As shown in FIGS. 4H(1), (3) and (5), the visual pattern could be configured to be consistent with human reactions (e.g., breathing, flickering, blinking, and swiping) associated with the voice processing state. For example, one of the most impactful places to use the Google brand colors, the attentive wake-up spin followed by the gentle breathing animation signals patient, and eager, yet respectful listening. The colors themselves conjure a sense of brand and embodiment of the Google voice assistant. These elements contrast with the dead front of the device to show very clear not recording and recording states.

2. Thinking Mode or Working Mode

Specifically, in some implementations, in accordance with a determination that the voice processing state is a thinking state that occurs when the electronic device is processing the voice inputs received from the user, an increasing number of full color LEDs are lit up during a first illumination cycle of the LED illumination duration, and a decreasing number of full color LEDs are lit up during a second illumination cycle following the first illumination cycle. Such a visual pattern is consistent with a human reaction that a person is thinking. Optionally, the microphones 402 are turned off in the thinking mode.

Referring to FIGS. 4H(3), 4H(5) and 4H(6), motion most similar to progress bars and other types of digital waiting signals are used in the visual pattern to indicate the thinking mode. In some implementations, white is used with the chasing animation. Brand colors are intentionally not used here to provide better distinction contrast and highlighting with respect to the other voice processing states.

3. Responding Mode or Speaking Mode

Alternatively, in some implementations, in accordance with a determination that the voice processing state is a responding state that occurs when the electronic device broadcasts a voice message in response to the voice inputs received from the user, a subset of the full color LEDs are lit up with a single color of distinct and varying brightness, and variation of the brightness of each of the subset of the fully color LEDs is consistent with a voice speed associated with the voice inputs from the user. In some implementations, the speaking mode is where the voice assistant shows its chops. A set of colors (e.g., the Google brand colors) are used in the visual pattern, such that the full color LEDs visually signifies closure to the voice query, i.e., that the question has been answered.

Individual Devices Involved in the Smart Media Environment

Figure 5:
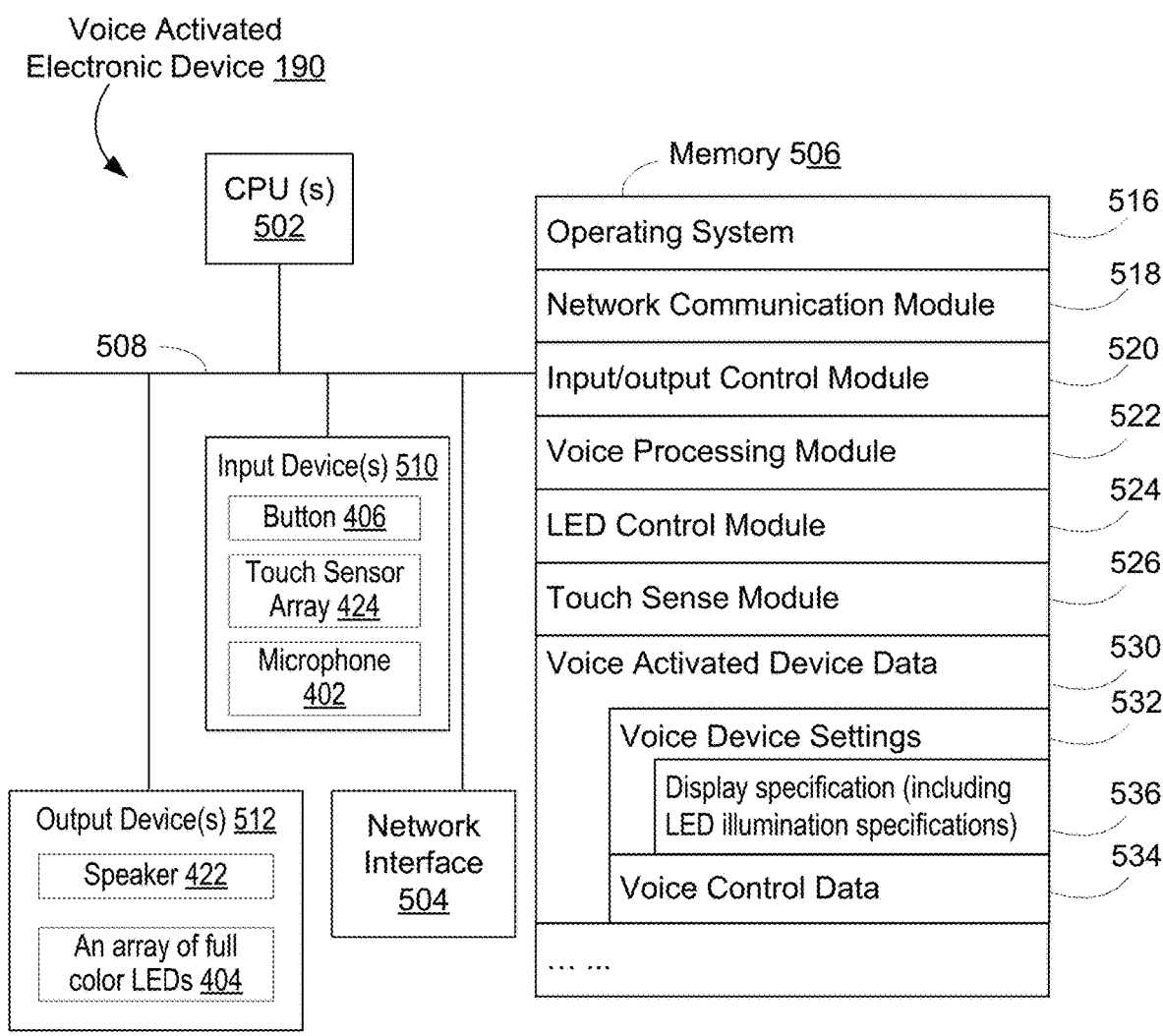
FIG. 5 is a block diagram illustrating an example electronic device that is applied as a voice interface to collect user voice commands in a smart media environment in accordance with some implementations.

FIG. 5 is a block diagram illustrating an example electronic device 190 that is applied as a voice interface to collect user voice commands in a smart media environment 100 in accordance with some implementations. The electronic device 190, typically, includes one or more processing units (CPUs) 502, one or more network interfaces 504, memory 506, and one or more communication buses 508 for interconnecting these components (sometimes called a chipset). The electronic device 190 includes one or more input devices 510 that facilitate user input, such as the button 406, the touch sense array and the one or more microphones 402 shown in FIGS. 4A-4H. The electronic device 190 also includes one or more output devices 512, including one or more speakers 422 and the array of full color LEDs 404.

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

- Operating system 516 including procedures for handling various basic system services and for performing hardware dependent tasks;
- Network communication module 518 for connecting the electronic device 190 to other devices (e.g., the server system 140, the cast device 108, the client device 104, the smart home devices 120 and the other electronic device(s) 190) via one or more network interfaces 504 (wired or wireless) and one or more networks 110, such as the Internet, other wide area networks, local area networks, metropolitan area networks, and so on;
- Input/output control module for receiving inputs via one or more input devices 510 enabling presentation of information at the electronic device 190 via one or more output devices 512, including:
  - Voice processing module 522 for processing audio inputs or voice messages collected in an environment surrounding the electronic device 190, or preparing the collected audio inputs or voice messages for processing at a voice assistance server 112 or a cloud cast service server 118;
  - LED control module 524 for generating visual patterns on the full color LEDs 404 according to device states of the electronic device 190; and
  - Touch sense module 526 for sensing touch events on a top surface of the electronic device 190; and
- Voice activated device data 530 storing at least data associated with the electronic device 190, including:
  - Voice device settings 532 for storing information associated with the electronic device 190 itself, including common device settings (e.g., service tier, device model, storage capacity, processing capabilities, communication capabilities, etc.), information of a user account in a user domain, and display specifications 536 associated with one or more visual patterns displayed by the full color LEDs; and
  - Voice control data 534 for storing audio signals, voice messages, response messages and other data related to voice interface functions of the electronic device 190.

Specifically, the display specifications 536 associated with one or more visual patterns displayed by the full color LEDs include predetermined LED illumination specifications associated with each of the one or more visual patterns. For each of the full color LEDs, the illumination specifications include one or more of an LED illumination duration, pulse rate, duty cycle, color sequence and brightness associated with the respective visual pattern. Each visual pattern corresponds to at least one voice processing state.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figure 6:
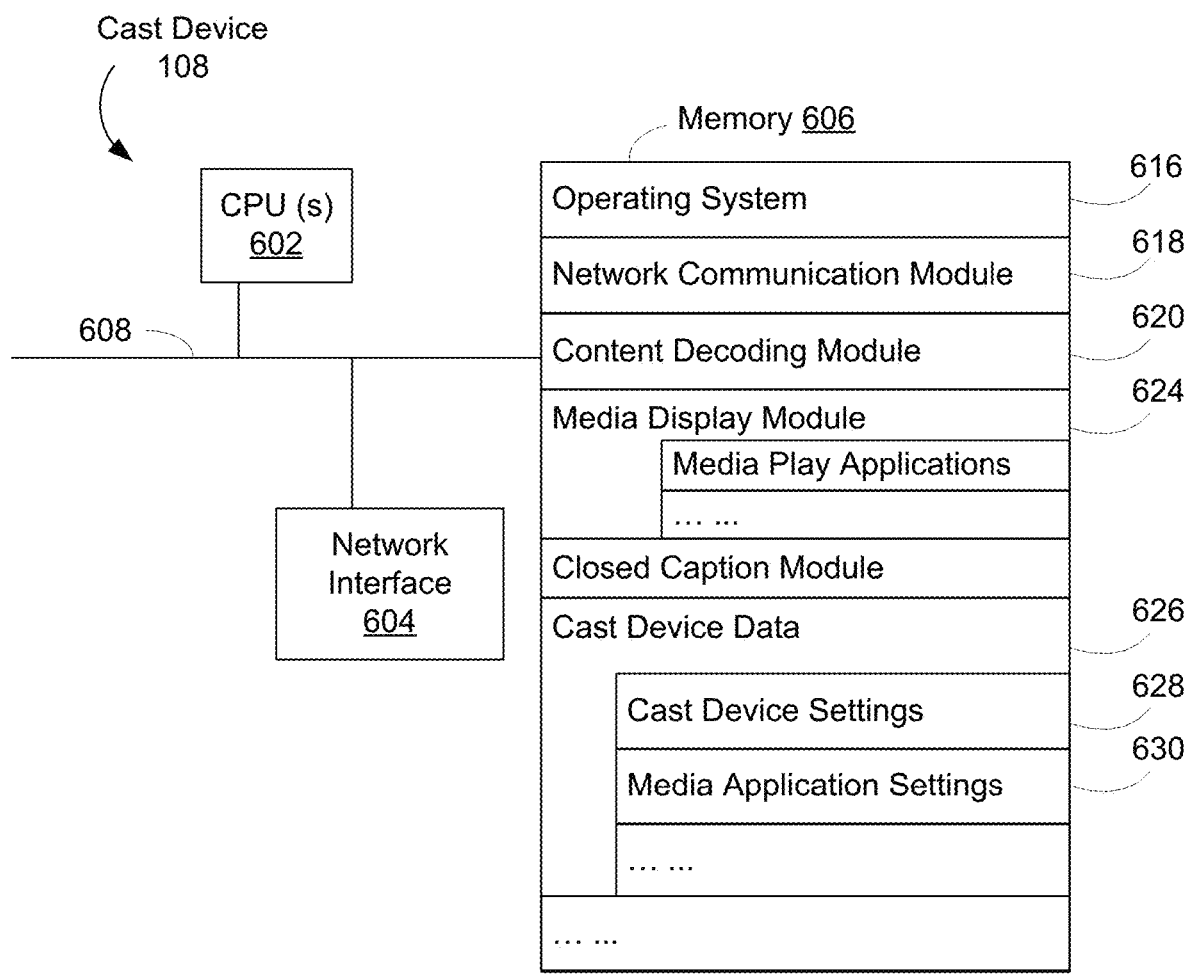
FIG. 6 is a block diagram illustrating an example cast device that is applied for automatic control of display of media content in a smart media environment in accordance with some implementations.

FIG. 6 is a block diagram illustrating an example cast device 108 that is applied for automatic control of display of media content in a smart media environment 100 in accordance with some implementations. The cast device 108, typically, includes one or more processing units (CPUs) 602, one or more network interfaces 604, memory 606, and one or more communication buses 608 for interconnecting these components (sometimes called a chipset).

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 602. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating system 616 including procedures for handling various basic system services and for performing hardware dependent tasks;
- Network communication module 618 for connecting the cast device 108 to other computers or systems (e.g., the server system 140, the smart home devices 120 and the client device 104) via one or more network interfaces 604 (wired or wireless) and one or more networks 110, such as the Internet, other wide area networks, local area networks, metropolitan area networks, cable television systems, satellite television systems, IPTV systems, and so on;
- Content decoding module 620 for decoding content signals received from one or more content sources 114 and outputting the content in the decoded signals to an output display device 106 coupled to the cast device 108;
- Automatic media display module 624 including one or more media play applications 624 for controlling media display, e.g., causing media output to the output device 106 according to instant media play information received from a cloud cast service server 116; and
- cast device data 626 storing at least data associated with automatic control of media display (e.g., in an automatic media output mode and a follow-up mode), including:
  - Cast device settings 628 for storing information associated with user accounts of a cast device application, including one or more of account access information, information for device settings (e.g., service tier, device model, storage capacity, processing capabilities, communication capabilities, etc.), and information for automatic media display control; and
  - Media player application settings 630 for storing information associated with user accounts of one or more media player applications, including one or more of account access information, user preferences of media content types, review history data, and information for automatic media display control.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
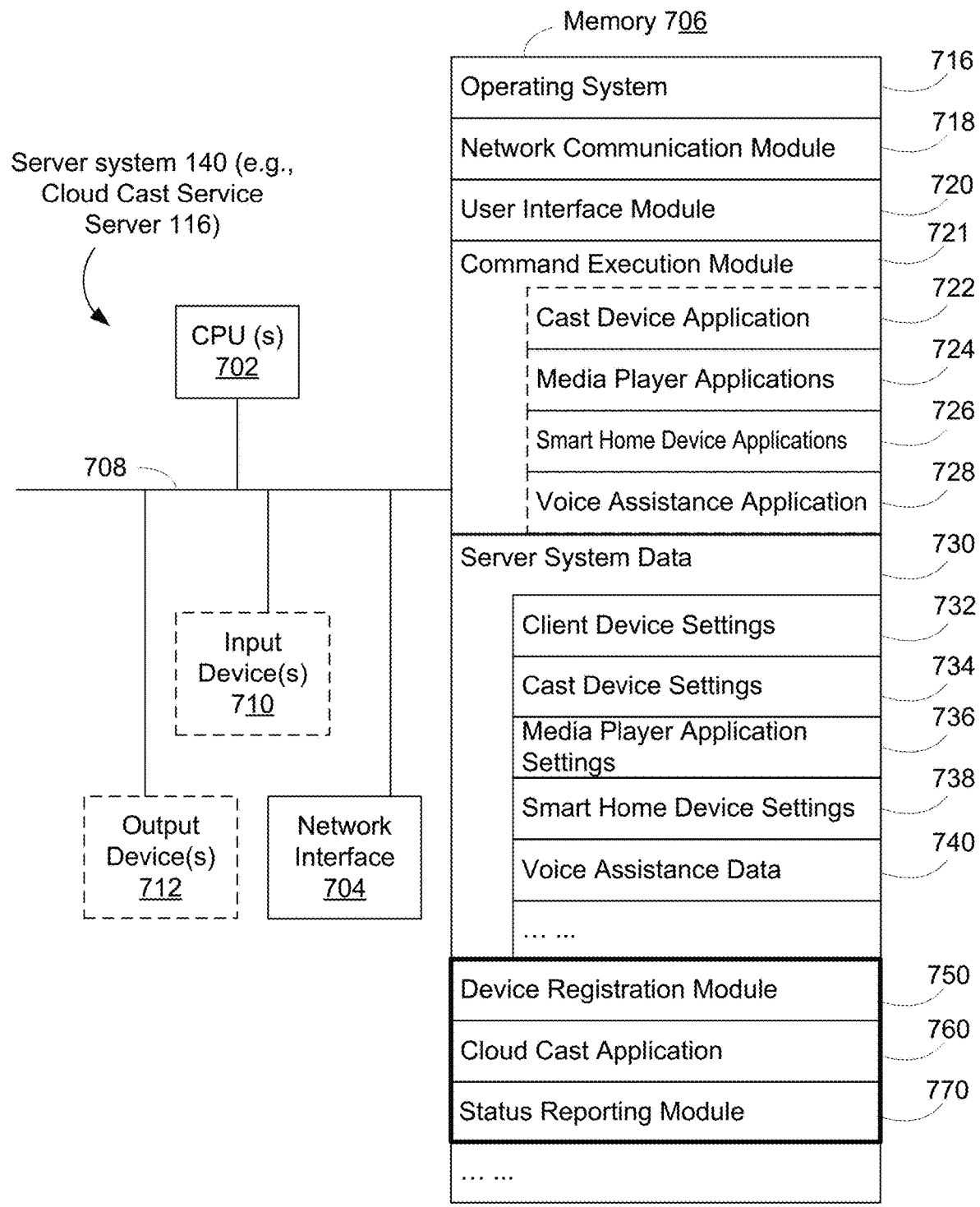
FIG. 7 is a block diagram illustrating an example server in the server system 140 of a smart media environment in accordance with some implementations. An example server is one of a cloud cast service sever.

FIG. 7 is a block diagram illustrating an example server in the server system 140 of a smart media environment 100 in accordance with some implementations. An example server is one of a cloud cast service sever 116. The server 140, typically, includes one or more processing units (CPUs) 702, one or more network interfaces 704, memory 706, and one or more communication buses 708 for interconnecting these components (sometimes called a chipset). The server 140 could include one or more input devices 710 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 712 that enable presentation of user interfaces and display content, including one or more speakers and/or one or more visual displays.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the server system 140 to other devices (e.g., various servers in the server system 140, the client device 104, the cast device 108, and the smart home devices 120) via one or more network interfaces 704 (wired or wireless) and one or more networks 110, such as the Internet, other wide area networks, local area networks, metropolitan area networks, and so on;

User interface module 720 for enabling presentation of information (e.g., a graphical user interface for presenting application(s) 826-830, widgets, websites and web pages thereof, and/or games, audio and/or video content, text, etc.) at the client device 104;

Command execution module 721 for execution on the server side (e.g., games, social network applications, smart home applications, and/or other web or non-web based applications for controlling the client device 104, the cast devices 108, the electronic device 190 and the smart home devices 120 and reviewing data captured by such devices), including one or more of:

a cast device application 722 that is executed to provide server-side functionalities for device provisioning, device control, and user account management associated with cast device(s) 108;

one or more media player applications 724 that is executed to provide server-side functionalities for media display and user account management associated with corresponding media sources;

one or more smart home device applications 726 that is executed to provide server-side functionalities for device provisioning, device control, data processing and data review of corresponding smart home devices 120; and a voice assistance application 728 that is executed to arrange voice processing of a voice message received from the electronic device 190 or directly process the voice message to extract a user voice command and a designation of a cast device 108 or another electronic device 190; and Server system data 730 storing at least data associated with automatic control of media display (e.g., in an automatic media output mode and a follow-up mode), including one or more of:

Client device settings 732 for storing information associated with the client device 104, including common device settings (e.g., service tier, device model, storage capacity, processing capabilities, communication capabilities, etc.), and information for automatic media display control;

Cast device settings 734 for storing information associated with user accounts of the cast device application 722, including one or more of account access information, information for device settings (e.g., service tier, device model, storage capacity, processing capabilities, communication capabilities, etc.), and information for automatic media display control;

Media player application settings 736 for storing information associated with user accounts of one or more media player applications 724, including one or more of account access information, user preferences of media content types, review history data, and information for automatic media display control;

Smart home device settings 738 for storing information associated with user accounts of the smart home applications 726, including one or more of account access information, information for one or more smart home devices 120 (e.g., service tier, device model, storage capacity, processing capabilities, communication capabilities, etc.); and Voice assistance data 740 for storing information associated with user accounts of the voice assistance application 728, including one or more of account access information, information for one or more electronic device 190 (e.g., service tier, device model, storage capacity, processing capabilities, communication capabilities, etc.).

When the server 140 includes a cloud cast service server 116, memory 706, or the non-transitory computer readable storage medium of memory 706, stores the following programs, modules, and data structures, or a subset or superset thereof:

Device registration module 750 for managing the device registry 118 coupled to the cloud cast service server 116;

Cloud cast application 760 for relaying a user voice command identified in a voice message to one or more of the cast device(s) 180, the electronic device(s) 190 and the smart home device(s) 120 that are coupled in a cloud cast user domain; and Status reporting module 770 for maintaining the states of the cast device(s) 180, the electronic device(s) 190 and the smart home device(s) 120 that are coupled in a cloud cast user domain.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
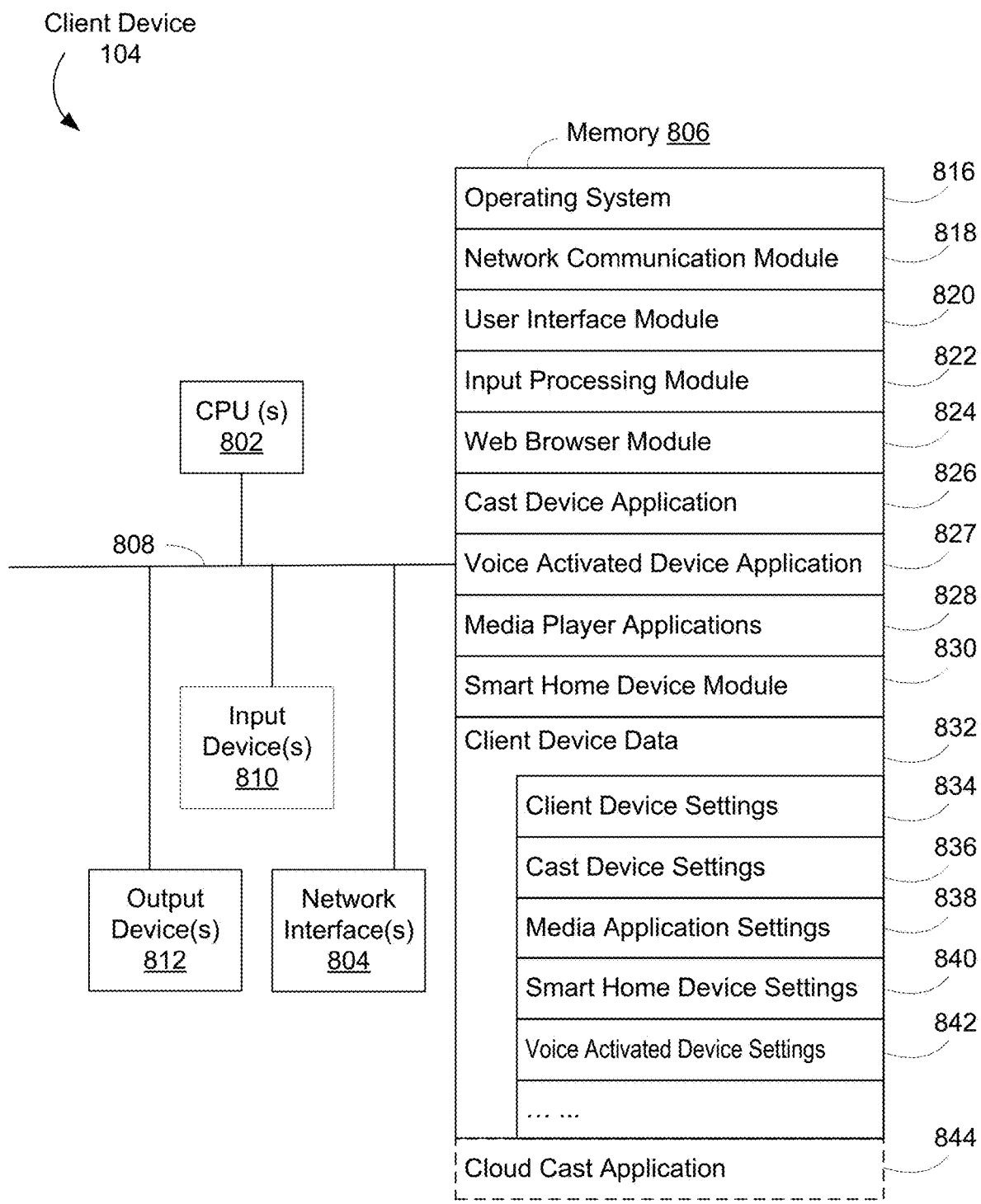
FIG. 8 is a block diagram illustrating an example client device that is applied for automatic control of media display in a smart media environment in accordance with some implementations.

FIG. 8 is a block diagram illustrating an example client device 104 that is applied for automatic control of media display in a smart media environment 100 in accordance with some implementations. Examples of the client device include, but are not limited to, a mobile phone, a tablet computer and a wearable personal device. The client device 104, typically, includes one or more processing units (CPUs) 802, one or more network interfaces 804, memory 806, and one or more communication buses 808 for interconnecting these components (sometimes called a chipset). The client device 104 includes one or more input devices 810 that facilitate user input, such as a keyboard, a mouse, a voice-command input unit or microphone, a touch screen display, a touch-sensitive input pad, a gesture capturing camera, or other input buttons or controls. Furthermore, some the client devices 104 use a microphone and voice recognition or a camera and gesture recognition to supplement or replace the keyboard. In some implementations, the client device 104 includes one or more cameras, scanners, or photo sensor units for capturing images, for example, of graphic series codes printed on the electronic devices. The client device 104 also includes one or more output devices 812 that enable presentation of user interfaces and display content, including one or more speakers and/or one or more visual displays. Optionally, the client device 104 includes a location detection device 814, such as a GPS (global positioning satellite) or other geo-location receiver, for determining the location of the client device 104.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 816 including procedures for handling various basic system services and for performing hardware dependent tasks;

Network communication module 818 for connecting the client device 104 to other devices (e.g., the server system 140, the cast device 108, the electronic device 190, the smart home devices 120 and the other client devices 104) via one or more network interfaces 804 (wired or wireless) and one or more networks 110, such as the Internet, other wide area networks, local area networks, metropolitan area networks, and so on;

User interface module 820 for enabling presentation of information (e.g., a graphical user interface for presenting application(s) 826-830, widgets, websites and web pages thereof, and/or games, audio and/or video content, text, etc.) at the client device 104 via one or more output devices 812 (e.g., displays, speakers, etc.);

Input processing module 822 for detecting one or more user inputs or interactions from one of the one or more input devices 810 and interpreting the detected input or interaction;

Web browser module 824 for navigating, requesting (e.g., via HTTP), and displaying websites and web pages thereof, including a web interface for logging into a user account associated with a cast device 108, an electronic device 190, a media application or a smart home device 120, controlling the cast device 108, the electronic device 190 or the smart home device 120 if associated with the user account, and editing and reviewing settings and data that are associated with the user account;

One or more applications for execution by the client device (e.g., games, social network applications, smart home applications, and/or other web or non-web based applications for controlling the cast devices 108, the electronic device 190 and/or the smart home devices 120 and reviewing data captured by such devices), including one or more of:

a cast device application 826 that is executed to provide client-side functionalities for device provisioning, device control, and user account management associated with cast device(s) 108;

a voice activated device application 827 that is executed to provide client-side functionalities for device provisioning, device control, and user account management associated with electronic device 190;

one or more media player applications 828 that is executed to provide client-side functionalities for media display and user account management associated with corresponding media sources; and one or more smart home device applications 830 that is executed to provide client-side functionalities for device provisioning, device control, data processing and data review of corresponding smart home devices 120; and client data 832 storing at least data associated with automatic control of media display (e.g., in an automatic media output mode or a follow-up mode), including:

Client device settings 834 for storing information associated with the client device 104 itself, including common device settings (e.g., service tier, device model, storage capacity, processing capabilities, communication capabilities, etc.), and information for automatic media display control;

Cast device settings 836 for storing information associated with user accounts of the cast device application 826, including one or more of account access information, information for device settings (e.g., service tier, device model, storage capacity, processing capabilities, communication capabilities, etc.), and information for automatic media display control;

Media player application settings 838 for storing information associated with user accounts of one or more media player applications 828, including one or more of account access information, user preferences of media content types, review history data, and information for automatic media display control;

Smart home device settings 840 for storing information associated with user accounts of the smart home applications 830, including one or more of account access information, information for smart home device settings (e.g., service tier, device model, storage capacity, processing capabilities, communication capabilities, etc.); and Voice activated device settings 842 for storing information associated with user accounts of the voice activated device application 827, including one or more of account access information, information for electronic device settings (e.g., service tier, device model, storage capacity, processing capabilities, communication capabilities, etc.).

In some implementations, each of the cast device application 826, the voice activated device application 827, the media player applications 828 and the smart home device applications 830 causes display of a respective user interface on the output device 812 of the client device 104. In some implementations, user accounts of a user associated with the cast device application 826, the voice activated device application 827, the media player applications 828 and the smart home device applications 830 are linked to a single cloud cast service account. The user may use the cloud cast service account information to log onto all of the cast device application 826, the voice activated device application 827, the media player applications 828 and the smart home device applications 830. In some implementations, the memory 806, or the non-transitory computer readable storage medium of memory 806, stores a cloud cast application 844 that is executed to provide client-side functionalities for function control and user account management associated with the cast device 108, the smart home device 120 and the electronic device 190 that are linked to the same cloud cast service account (e.g., a Google user account).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
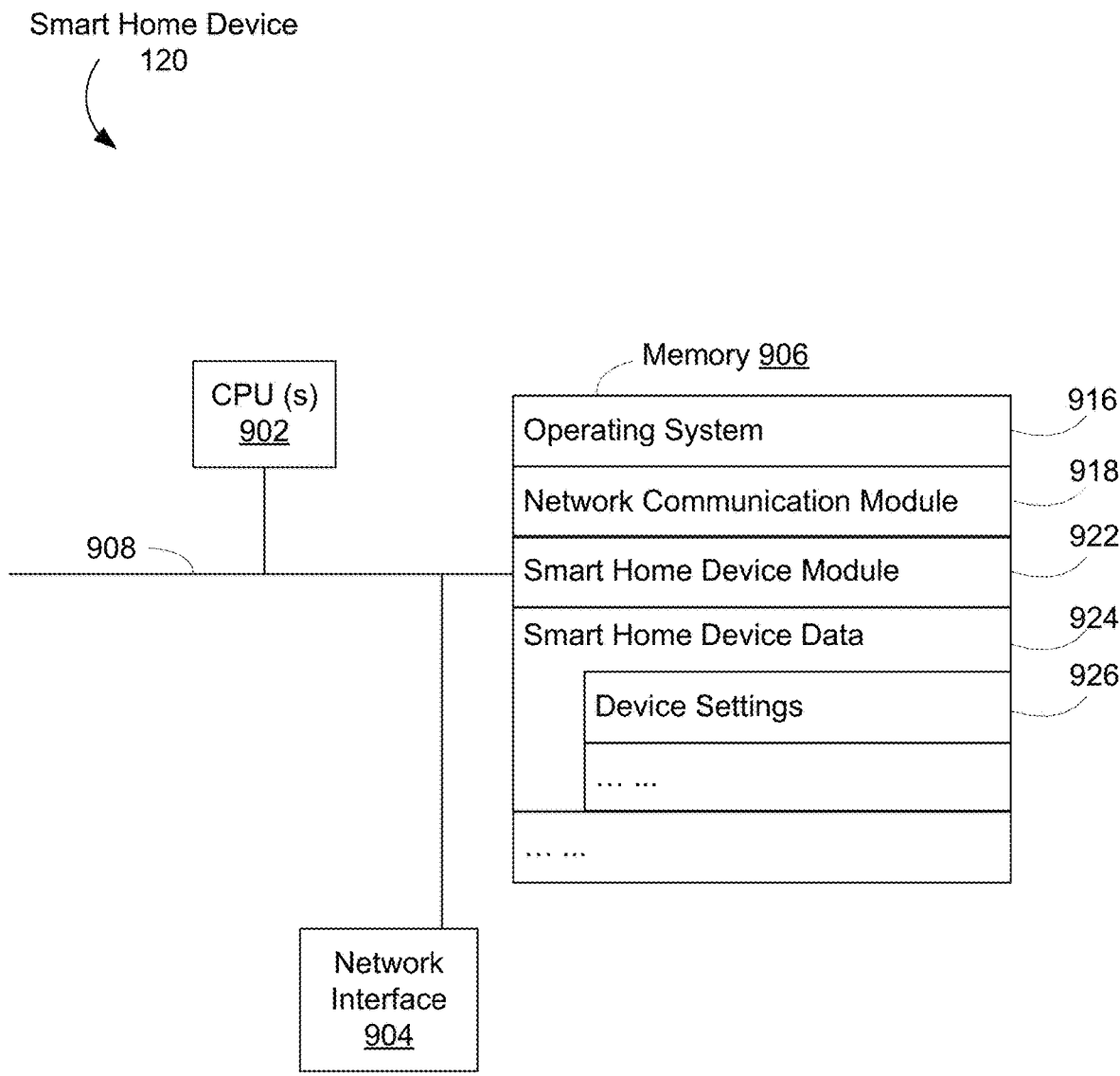
FIG. 9 is a block diagram illustrating an example smart home device in a smart media environment in accordance with some implementations.

FIG. 9 is a block diagram illustrating an example smart home device 120 in a smart media environment 100 in accordance with some implementations. The smart home device 120, typically, includes one or more processing units (CPUs) 902, one or more network interfaces 904, memory 906, and one or more communication buses 908 for interconnecting these components (sometimes called a chipset). Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, optionally, includes one or more storage devices remotely located from one or more processing units 902. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

Operating system 916 including procedures for handling various basic system services and for performing hardware dependent tasks for the smart home device 120;

Network communication module 918 for connecting the smart home device 120 to other computers or systems (e.g., the server system 140, the client device 104, the cast device 108, the electronic device 190 and other smart home devices 120) via one or more network interfaces 904 (wired or wireless) and one or more networks 110, such as the Internet, other wide area networks, local area networks, metropolitan area networks, and so on;

Smart home device module 922 for enabling the smart home device 120 to implement its designated functions (e.g., for capturing and generating multimedia data streams and sending the multimedia data stream to the client device 104 or the server system 140 as a continuous feed or in short bursts, when the smart home device 120 includes a video camera 132);

Smart home device data 924 storing at least data associated with device settings 926.

In some implementations, the smart home device 120 is controlled by voice. Specifically, the cloud cast service server 116 receives a voice message recorded by an electronic device 190, and determines that the voice message includes a smart device control request (e.g., zoom in or out of a video camera, turning off a false alarm and an inquiry of the temperature measured from a smart thermostat). The smart device control request includes a user voice command to control a smart home device 120 and a user voice designation of the smart home device. In accordance with the voice designation of the smart home device, the cloud cast service server 116 identifies in a device registry 118 a smart home device 120 associated in a user domain with the electronic device. The cloud cast service server 116 then sends to the smart home device 1290 another device control request, thereby enabling the smart home device module 922 of the smart home device 120 to control the smart home device 120 according to the user voice command.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 906, optionally, stores a subset of the modules and data structures identified

Figure 10:
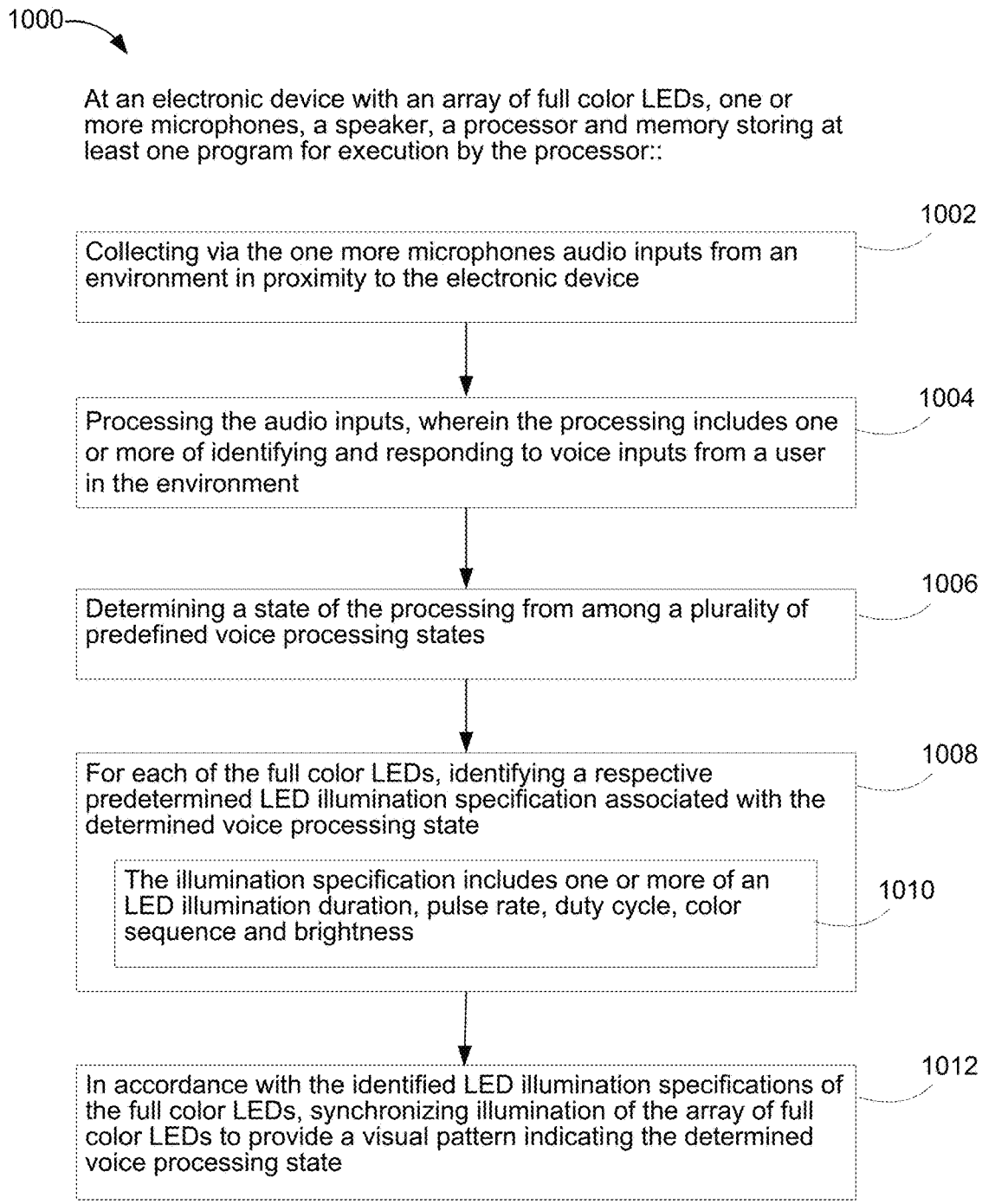
FIG. 10 is a flow diagram illustrating a method of visually indicating a voice processing state in accordance with some implementations.

Voice Based LED Display and Media Control Methods in the Smart Media Environment FIG. 10 is a flow diagram illustrating a method 1000 of visually indicating a voice processing state in accordance with some implementations. The method 1000 is implemented at an electronic device 190 with an array of full color LEDs, one or more microphones, a speaker, a processor and memory storing at least one program for execution by the processor. The electronic device 190 collects (1002) via the one or more microphones 402 audio inputs from an environment in proximity to the electronic device 190, and processes (1004) the audio inputs. The processing is implemented at voice processing module 522, and includes one or more of identifying and responding to voice inputs from a user in the environment. The electronic device 190 then determines (1006) a state of the processing from among a plurality of predefined voice processing states. For each of the full color LEDs, the electronic device 190 identifies (1008) a respective predetermined LED illumination specification associated with the determined voice processing state, and the respective illumination specification includes (1010) one or more of an LED illumination duration, pulse rate, duty cycle, color sequence and brightness. In accordance with the identified LED illumination specifications of the full color LEDs, the electronic device 190 (specifically, LED control module 524) synchronizes illumination of the array of full color LEDs to provide a visual pattern indicating the determined voice processing state. More details on the method 1000 have been explained above with reference to FIGS. 4A-4H and 5.

Method 1000 is, optionally, governed by instructions that are stored in a non-transitory computer readable storage medium and that are executed by one or more processors of a voice-activated electronic device 190. Each of the operations shown in FIG. 10 may correspond to instructions stored in the computer memory or computer readable storage medium (e.g., memory 506 of the electronic device 190 in FIG. 5). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1000 may be combined and/or the order of some operations may be changed.

Figure 11:
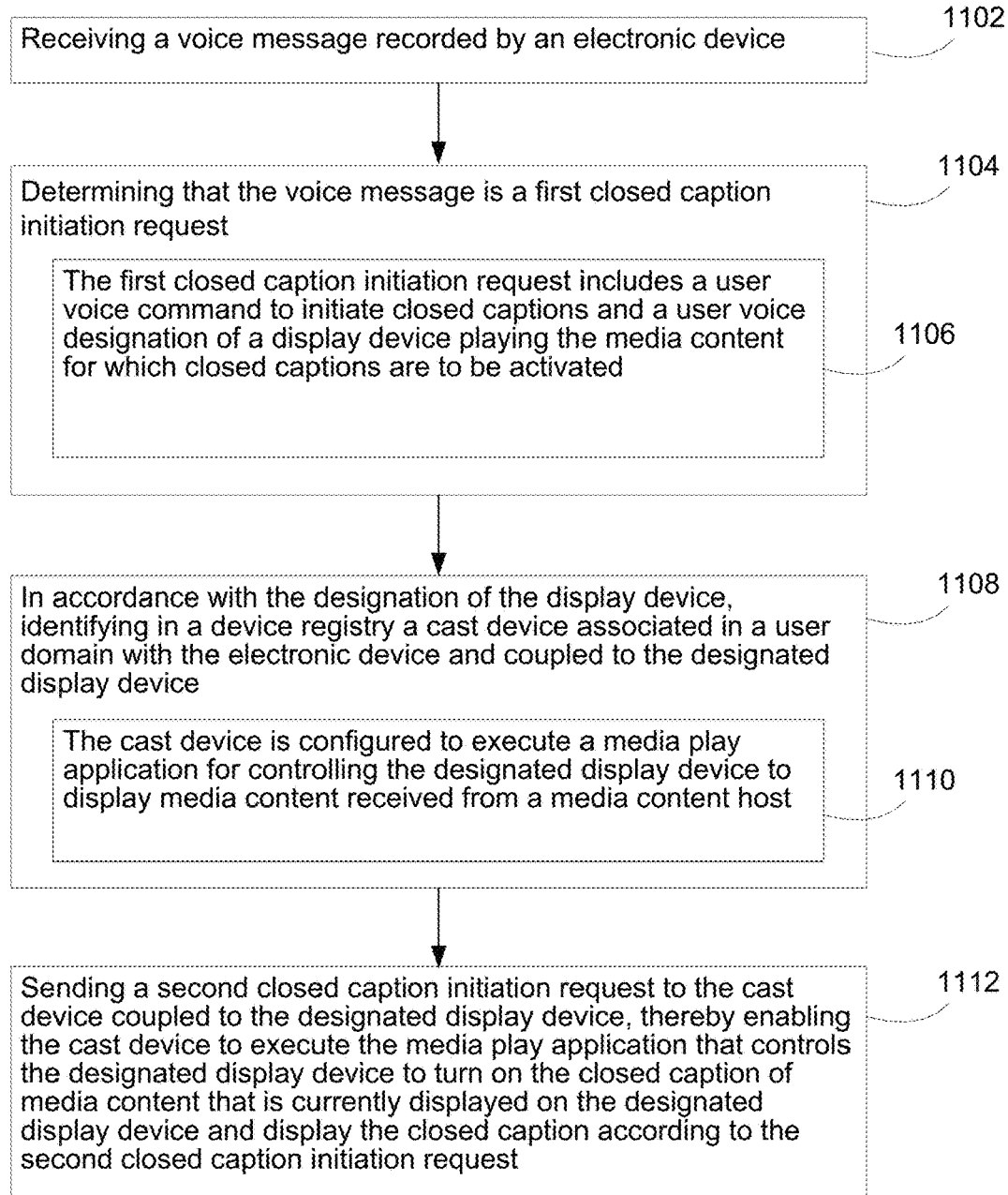
FIG. 11 is a flow diagram illustrating a method of initiating display of closed captions for media content by voice in accordance with some implementations.

FIG. 11 is a flow diagram illustrating a method 1100 of initiating display of closed captions for media content by voice in accordance with some implementations. The method 1100 is implemented at a server system (e.g., a cloud cast service server 116) including a processor and memory storing at least one program (e.g., the cloud cast application 760) for execution by the processor. The server system receives (1102) a voice message recorded by an electronic device 190, and determines (1104) that the voice message is a first closed caption initiation request. The first closed caption initiation request includes (1106) a user voice command to initiate closed captions and a user voice designation of a display device 106 playing the media content for which closed captions are to be activated. In accordance with the designation of the display device, the server system identifies (1108) in a device registry 118 a cast device 108 associated in a user domain with the electronic device 190 and coupled to the designated display device 106. The cast device 108 is configured (1110) to execute a media play application for controlling the designated display device to display media content received from a media content host. The server system (specifically, the cloud cast application 760) then sends (1112) a second closed caption initiation request to the cast device coupled to the designated display device, thereby enabling the cast device to execute the media play application that controls the designated display device to turn on the closed caption of media content that is currently displayed on the designated display device and display the closed caption according to the second closed caption initiation request. More details on the method 1100 have been explained above with reference to FIGS. 2A, 2B and 5-7.

FIG. 12 is a flow diagram illustrating a method 1200 of initiating by voice play of media content on a media output device in accordance with some implementations. The method 1200 is implemented at a server system (e.g., a cloud cast service server 116) including a processor and memory storing at least one program for execution by the processor. The server system receives (1202) a voice message recorded by an electronic device, and determines (1204) that the voice message includes a first media play request. The first media play request includes (1206) a user voice command to play media content on a media output device and a user voice designation of the media output device 106, and the user voice command includes at least information of a first media play application and the media content that needs to be played. In accordance with the voice designation of the media output device, the server system identifies (1208) in a device registry 118 a cast device 108 associated in a user domain with the electronic device 190 and coupled to the media output device 106. The cast device 108 is configured to (1210) execute one or more media play applications for controlling the media output device 106 to play media content received from one or more media content hosts. The server system (specifically, the cloud cast application 760) then sends (1212) to the cast device 108 a second media play request including the information of the first media play application and the media content that needs to be played, thereby enabling the cast device 108 to execute the first media play application that controls the media output device 106 to play the media content. More details on the method 1200 have been explained above with reference to FIGS. 2A, 2B and 5-7.

Figure 13:
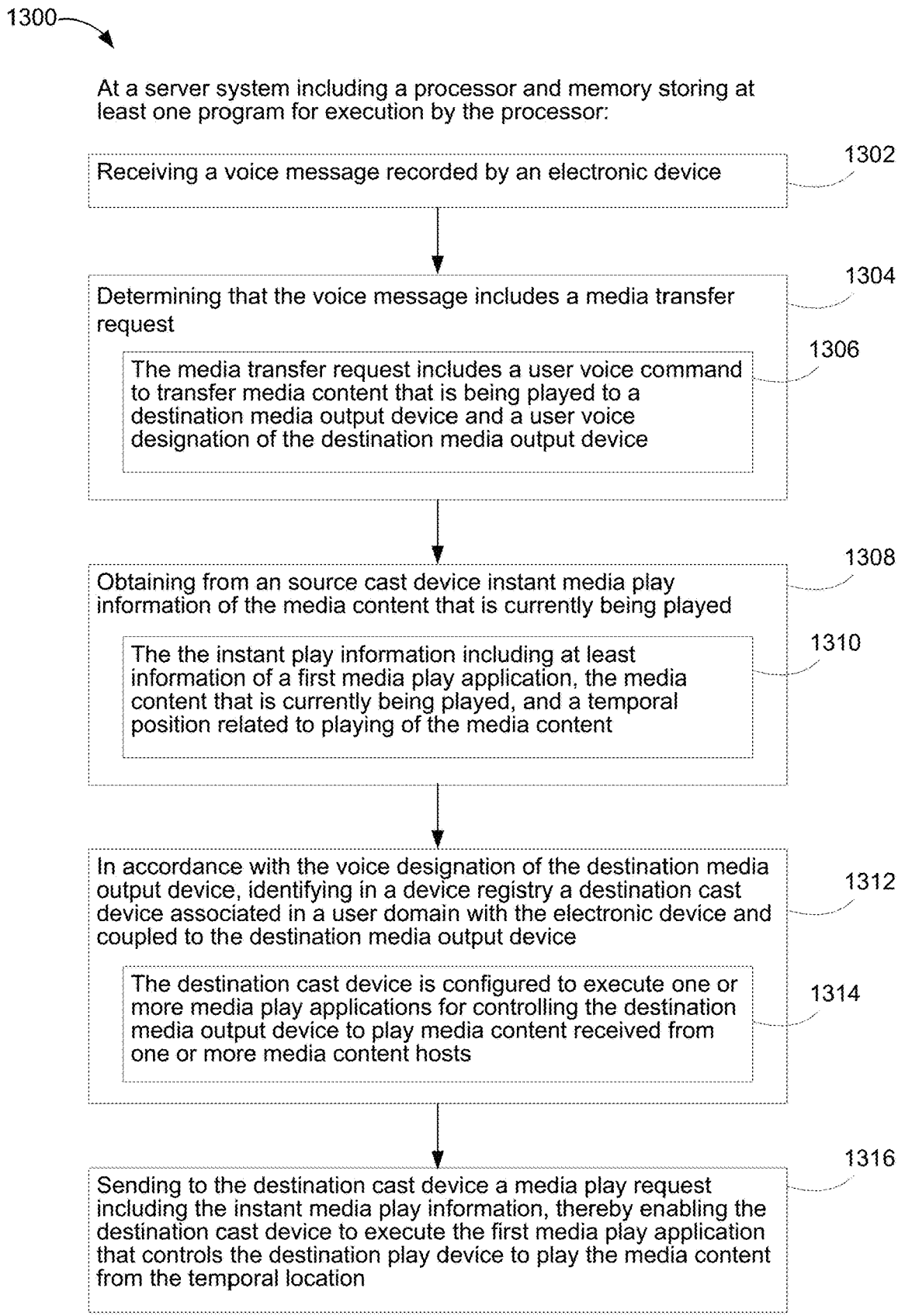
FIG. 13 is a flow diagram illustrating a method of moving play of media content from a source media output device to a destination media output device in accordance with some implementations.

FIG. 13 is a flow diagram illustrating a method 1300 of moving play of media content from a source media output device to a destination media output device in accordance with some implementations. The method 1200 is implemented at a server system (e.g., a cloud cast service server 116) including a processor and memory storing at least one program for execution by the processor.

The server system receives (1302) a voice message recorded by an electronic device 190, and determines (1304) that the voice message includes a media transfer request. The media transfer request includes (1306) a user voice command to transfer media content that is being played to a destination media output device and a user voice designation of the destination media output device. The server system obtains (1308) from a source cast device (e.g., the cast device 108-1 of FIG. 3) instant media play information of the media content that is currently being played. The instant play information includes (1310) at least information of a first media play application, the media content that is currently being played, and a temporal position related to playing of the media content.

In accordance with the voice designation of the destination media output device, the server system identifies (1312) in a device registry 118 a destination cast device (e.g., the cast device 108-2 of FIG. 3) associated in a user domain with the electronic device 190 and coupled to the destination media output device (e.g., the output device 106-2 of FIG. 3). The destination cast device is configured to (1314) execute one or more media play applications for controlling the destination media output device to play media content received from one or more media content hosts. The server system (specifically, the cloud cast application 760) then sends (1316) to the destination cast device a media play request including the instant media play information, thereby enabling the destination cast device to execute the first media play application that controls the destination media output device to play the media content from the temporal location. More details on the method 1300 have been explained above with reference to FIGS. 3 and 5-7.

Methods 1100, 1200 and 1300 are, optionally, governed by instructions that are stored in a non-transitory computer readable storage medium and that are executed by one or more processors of a cloud cast service server 116. Each of the operations shown in FIGS. 12-14 may correspond to instructions stored in the computer memory or computer readable storage medium (e.g., memory 706 of the server system in FIG. 7). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in each of the methods 1100, 1200 and 1300 may be combined and/or the order of some operations may be changed.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart media environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

It is noted that more details on the above-mentioned implementations and alternative embodiments are also disclosed in the Appendix filed with this application. In the Appendix, OOBE refers to out-of-box experience.

What is claimed is:
1. A method for visually indicating a voice processing state, comprising:
at an electronic device with an array of visual indicators, one or more microphones, a processor and memory storing at least one program for execution by the processor:
collecting via the one or more microphones audio inputs from an environment in proximity to the electronic device;

initiating processing of the audio inputs, wherein the processing includes one or more of identifying and responding to voice inputs from a user in the environment;

determining a state of the processing from among a plurality of predefined voice processing states;

for each of the visual indicators, identifying a respective predetermined illumination specification associated with the determined voice processing state; and in accordance with the identified illumination specifications of the visual indicators, synchronizing illumination of the array of visual indicators to provide a visual pattern indicating the determined voice processing state, wherein the visual pattern is displayed on a surface of the electronic device and includes one or more visually-discrete illumination elements;

wherein the visual indicators are hidden under the surface of the electronic device and invisible to the user when they are not lit.

2. The method of claim 1, wherein the illumination specification of each visual indicator includes one or more of an illumination duration, pulse rate, duty cycle and brightness.

3. The method of claim 2, wherein the visual pattern includes a start segment, a loop segment and a termination segment, and the loop segment lasts for a length of time associated with the illumination durations of the visual indicators and configured to match a length of the voice processing state.

4. The method of claim 2, wherein in accordance with a determination that the voice processing state is a thinking state that occurs when the electronic device is processing the voice inputs received from the user, an increasing number of visual indicators are lit up during a first illumination cycle of the illumination duration, and a decreasing number of visual indicators are lit up during a second illumination cycle following the first illumination cycle.

5. The method of claim 1, wherein the visual indicators are individually illuminated to form each of the one or more visually-discrete illumination elements according to the corresponding predetermined illumination specification.

6. The method of claim 1, wherein the plurality of predefined voice processing states include a hot word detection state in which the electronic device is configured to listen to and recognize one or more predefined hot words and does not to send any audio input to a remote server until at least one of the one or more predefined hot words is recognized.

7. The method of claim 1, wherein the electronic device does not include any display screen, and wherein a portion of the surface of the electronic device on which the visual pattern is displayed is substantially planar without exposing the visual indicators.

8. The method of claim 1, wherein in accordance with the determined voice processing state, colors of the visual indicators include a predetermined set of colors.

9. The method of claim 1, wherein the illumination specification of each visual indicator includes a color sequence.

10. The method of claim 8, wherein the predetermined set of colors include blue, green, yellow and red, and the array of visual indicators is divided into four quadrants each associated with one of the colors.

11. A non-transitory computer-readable medium, having instructions stored thereon, which when executed by one or more processors cause the processors to perform operations comprising:

at an electronic device with an array of visual indicators, one or more microphones, and a speaker:

collecting via the one or more microphones audio inputs from an environment in proximity to the electronic device;

initiating processing of the audio inputs, wherein the processing includes one or more of identifying and responding to voice inputs from a user in the environment;

determining a state of the processing from among a plurality of predefined voice processing states;

for each of the visual indicators, identifying a respective predetermined illumination specification associated with the determined voice processing state; and in accordance with the identified illumination specifications of the visual indicators, synchronizing illumination of the array of visual indicators to provide a visual pattern indicating the determined voice processing state, wherein the visual pattern is displayed on a surface of the electronic device and includes one or more visually-discrete illumination elements;

wherein the visual indicators are hidden under the surface of the electronic device and invisible to the user when they are not lit.

12. The non-transitory computer-readable medium of claim 11, wherein in accordance with a determination that the determined voice processing state is a hot word detection state that occurs when one or more predefined hot words are detected, the array of visual indicators is divided into a plurality of diode groups that are alternately arranged and configured to be lit sequentially, and diodes in each of the plurality of diode groups are lit with different colors.

13. The non-transitory computer-readable medium of claim 11, wherein in accordance with a determination that the determined voice processing state is a listening state that occurs when the electronic device is actively receiving the voice inputs from the environment and providing received voice inputs to a remote server, all visual indicators are lit up with a single color, and each visual indicator with different and varying brightness.

14. The non-transitory computer-readable medium of claim 11, wherein the plurality of predefined voice processing states includes one or more of a hot word detection state, a listening state, a thinking state and a responding state.

15. The non-transitory computer-readable medium of claim 11, wherein the visual pattern is consistent with human reactions associated with the voice processing state.

16. An electronic device, comprising:
an array of visual indicators;
one or more microphones;
a speaker;
one or more processors; and
memory having instructions stored thereon, which when executed by the one or more processors cause the processors to perform operations for:

collecting via the one or more microphones audio inputs from an environment in proximity to the electronic device;

initiating processing of the audio inputs, wherein the processing includes one or more of identifying and responding to voice inputs from a user in the environment;

determining a state of the processing from among a plurality of predefined voice processing states;

for each of the visual indicators, identifying a respective predetermined illumination specification associated with the determined voice processing state; and in accordance with the identified illumination specifications of the visual indicators, synchronizing illumination of the array of visual indicators to provide a visual pattern indicating the determined voice processing state, wherein the visual pattern is displayed on a surface of the electronic device and includes one or more visually-discrete illumination elements;

wherein the visual indicators are hidden under the surface of the electronic device and invisible to the user when they are not lit.

17. The electronic device of claim 16, wherein in accordance with a determination that the voice processing state is a responding state that occurs when the electronic device broadcasts a voice message in response to the voice inputs received from the user, a subset of the visual indicators are lit up with a single color of distinct and varying brightness, and variation of the brightness of each of the subset of the visual indicators is consistent with a voice speed associated with the voice inputs from the user.

18. The electronic device of claim 16, wherein:

the electronic device further includes a touch sense array configured to detect touch events on the surface of the electronic device;

the touch sense array is arranged on a top surface of a circuit board including an array of via holes, and the visual indicators are disposed within the via holes of the circuit board; and the circuit board is positioned immediately under the surface of the electronic device, thereby allowing the visual indicators and the touch sense array to be disposed immediately under the surface of the electronic device.

19. The electronic device of claim 16, the memory further having instructions for:

determining that the voice processing state is associated with one of a plurality of users, wherein identifying the predetermined illumination specifications of the visual indicators includes customizing at least one of the predetermined illumination specifications of the visual indicators according to an identity of the one of the plurality of users.

20. The electronic device of claim 16, wherein the array of visual indicators are physically arranged in a ring.

* * * * *